(12) United States Patent
Guynn

(10) Patent No.: US 11,655,186 B2
(45) Date of Patent: May 23, 2023

(54) ACTIVITATION OF NATURAL POZZOLANS

(71) Applicant: ROMAN CEMENT, LLC, Salt Lake City, UT (US)

(72) Inventor: John M. Guynn, Salt Lake City, UT (US)

(73) Assignee: ROMAN CEMENT, LLC, Salt Lake City, UT (US)

( * ) Notice: Subject to any disclaimer, the term of this patent is extended or adjusted under 35 U.S.C. 154(b) by 1118 days.

(21) Appl. No.: 16/241,994

(22) Filed: Jan. 8, 2019

(65) Prior Publication Data
US 2020/0123054 A1 Apr. 23, 2020

Related U.S. Application Data

(63) Continuation-in-part of application No. 15/862,854, filed on Jan. 5, 2018, now Pat. No. 10,233,116, which
(Continued)

(51) Int. Cl.
*C04B 7/00* (2006.01)
*C04B 7/13* (2006.01)
(Continued)

(52) U.S. Cl.
CPC ........... *C04B 7/13* (2013.01); *C04B 7/02* (2013.01); *C04B 7/147* (2013.01); *C04B 7/26* (2013.01); *C04B 7/28* (2013.01); *C04B 2201/50* (2013.01)

(58) Field of Classification Search
CPC .. C04B 7/00; C04B 7/34; C04B 28/00; C04B 32/00; C04B 14/00; C04B 18/06;
(Continued)

(56) References Cited

U.S. PATENT DOCUMENTS

| 3,951,347 A | 4/1976 | Tiggesbaumker |
| 4,405,372 A | 9/1983 | Serafin et al. |

(Continued)

FOREIGN PATENT DOCUMENTS

| CN | 105948542 A | 9/2016 |
| CN | 108002721 A | 5/2018 |

(Continued)

OTHER PUBLICATIONS

Olekambainei (The Influence Of Moisture Content On the Engineering Properties Of Aggregate-Lime-Natural Pozzolan Mixes, Oct. 2004, Dissertation, University of Pretoria, Pretoria), (Year: 2005).*

(Continued)

*Primary Examiner* — James E McDonough
(74) *Attorney, Agent, or Firm* — Workman Nydegger

(57) ABSTRACT

An activated pozzolan composition includes a fine interground particulate blend of an initially unactivated natural pozzolan and a supplementary cementitious material (SCM) different than the initially unactivated natural pozzolan. The initially unactivated natural pozzolan may include volcanic ash or other natural pozzolanic deposit having a moisture content of at least 3%, and the activated pozzolan composition can have a moisture content less than 0.5% The initially unactivated natural pozzolan may have a particle size less than 1 mm before intergrinding with the SCM. The SCM used to activate the initially unactivated natural pozzolan can be initially coarse or granular with a size greater than 1-3 µm and may include granulated blast furnace slag, steel slag, other metallurgical slag, pumice, limestone, fine aggregate, shale, tuff, trass, geologic material, waste glass, glass shards, basalt, sinters, ceramics, recycled bricks, recycled concrete, refractory materials, other waste industrial products, sand, or natural mineral.

17 Claims, 15 Drawing Sheets

Related U.S. Application Data is a continuation of application No. 15/332,468, filed on Oct. 24, 2016, now Pat. No. 10,494,298.

(60) Provisional application No. 62/245,399, filed on Oct. 23, 2015.

(51) Int. Cl.

| | | |
|---|---|---|
| *C04B 7/02* | (2006.01) | |
| *C04B 7/147* | (2006.01) | |
| *C04B 7/26* | (2006.01) | |
| *C04B 7/28* | (2006.01) | |
| C04B 7/34 | (2006.01) | |
| C04B 28/00 | (2006.01) | |
| C04B 32/00 | (2006.01) | |
| C04B 14/00 | (2006.01) | |
| C04B 18/06 | (2006.01) | |

(58) Field of Classification Search
CPC .. C04B 7/13; C04B 7/02; C04B 7/147; C04B 7/26; C04B 7/28; C04B 2201/50
USPC .............. 106/638, 705, 707; 241/30
See application file for complete search history.

(56) References Cited

U.S. PATENT DOCUMENTS

| | | | |
|---|---|---|---|
| 5,626,665 | A | 5/1997 | Barger |
| 6,033,468 | A | 3/2000 | Folks et al. |
| 6,213,415 | B1 | 4/2001 | Cheung |
| 7,799,128 | B2 | 9/2010 | Guynn et al. |
| 7,972,432 | B2 | 7/2011 | Guynn et al. |
| 8,323,399 | B2 | 12/2012 | Guynn et al. |
| 8,377,201 | B2 | 2/2013 | Guynn et al. |
| 8,414,700 | B2 | 4/2013 | Guynn et al. |
| 8,496,750 | B2 | 7/2013 | McKee |
| 8,551,245 | B2 | 10/2013 | Guynn et al. |
| 8,974,593 | B2 | 3/2015 | Guynn et al. |
| 9,067,824 | B1 | 6/2015 | Hansen et al. |
| 9,102,567 | B1* | 8/2015 | Hansen .................... F17D 3/01 |
| 9,238,591 | B2 | 1/2016 | Guynn et al. |
| 9,272,953 | B2 | 3/2016 | Guynn et al. |
| 10,233,116 | B1 | 3/2019 | Guynn |
| 10,494,298 | B1 | 12/2019 | Guynn |
| 2003/0159624 | A1 | 8/2003 | Kinuthia |
| 2007/0051515 | A1 | 3/2007 | Fyten et al. |
| 2012/0145046 | A1* | 6/2012 | Hansen ................. G06Q 99/00 106/739 |
| 2012/0325477 | A1 | 12/2012 | Brenneis et al. |
| 2013/0233208 | A1 | 9/2013 | Ronin |
| 2014/0048267 | A1* | 2/2014 | Pisklak ................... E21B 33/14 166/292 |
| 2014/0123879 | A1 | 5/2014 | Karcher et al. |
| 2014/0224154 | A1* | 8/2014 | Guynn ..................... C04B 7/38 106/638 |
| 2014/0299023 | A1* | 10/2014 | Guynn ................... C04B 28/04 106/709 |
| 2017/0166791 | A1 | 6/2017 | Greenwald |
| 2018/0065888 | A1 | 3/2018 | Donovan et al. |
| 2018/0194679 | A1 | 7/2018 | Guynn |

FOREIGN PATENT DOCUMENTS

| | | |
|---|---|---|
| GB | 2116162 A | 9/1983 |
| WO | 2002/070424 A1 | 9/2002 |
| WO | 2011/130482 A2 | 10/2011 |

OTHER PUBLICATIONS

U.S. Appl. No. 15/332,468, filed Oct. 24, 2016, John M. Guynn.
Arip-Kituyan Emmanuel Olekambainei, "The Influence Of Moulding Moisture Content On The Engineering Properties Of Aggregate-Lime-Natural Pozzolan Mixes", Dissertation, Masters of Engineering, University of Pretoria, Oct. 2004.
Activating a natural pozzolan moisture—Google Search; Aug. 1, 2018.
Cement & Concrete Composites: High-volume natural volcanic pozzolan and limestone powder as partial replacements for Portland cement in self-compacting and sustainable concrete, K. Celik et al., Cement & Concrete Composites 45 (2014) 136-147).
Wikipedia, Lime, downloaded Aug. 14, 2018.
ILia Fresco (Anossov), Lime Cycle—fresco plaster, Sep. 22, 2013.
International Preliminary Report on Patentability received for PCT Patent Application No. PCT/US2020/012812, dated Jul. 22, 2021, 9 pages.
International Search Report and Written Opinion received for PCT Patent Application No. PCT/US2020/012812, dated Apr. 2, 2020, 10 pages.
U.S. Appl. No. 15/862,854, filed Jan. 5, 2018, Guynn.
U.S. Appl. No. 15/332,468, filed Oct. 19, 2018, Office Action.
U.S. Appl. No. 15/332,468, filed Feb. 28, 2019, Final Office Action.
U.S. Appl. No. 15/332,468, filed Jul. 18, 2019, Notice of Allowance.
U.S. Appl. No. 15/862,854, filed Aug. 9, 2018, Office Action.
U.S. Appl. No. 15/862,854, filed Dec. 26, 2018, Notice of Allowance.
U.S. Appl. No. 15/862,854, filed Feb. 6, 2019, Notice of Allowance.
Calcination, 1-2, https://en.wikipedia.org/wiki/Calcination.
Gupta Sudhir Kumar et al., Lime Calcination, 1, https://link.springer.com/chapter/10.1007/978-1-59745-173-4_14, Jul. 29, 2022.
Richard Pallardy, Limestone, 1-4, https://www.britannica.com/science/limestone.
Satyendra, Calcination of Limestone, May 2, 2013, 9, https://www.ispatguru.com/calcination-of-limestone/, Jul. 29, 2022.
WikipediA, Limestone, 10, https://en.wikipedia.org/wiki/Limestone, Jul. 29, 2022.

* cited by examiner

ACTIVITATION OF NATURAL POZZOLANS

CROSS-REFERENCE TO RELATED APPLICATIONS

This Application is a continuation-in-part of U.S. patent application Ser. No. 15/862,854, filed Jan. 5, 2018, now U.S. Pat. No. 10,233,116, which is a continuation of U.S. patent application Ser. No. 15/332,468, filed Oct. 24, 2016, now U.S. Pat. No. 10,494,298, which claims the benefit of U.S. Provisional Patent Application No. 62/245,399, filed Oct. 23, 2015. The disclosures of the foregoing patents and patent applications are incorporated herein by references in their entirety.

BACKGROUND OF THE INVENTION

1. Field of the Invention

The invention is generally in the field of supplementary cementitious materials, natural pozzolans, activation of natural pozzolans, and blends of natural pozzolans and other materials.

2. Relevant Technology

Supplementary Cementitious Materials (SCMs), such as coal ash, metallurgical slags, natural pozzolans, biomass ash, post-consumer glass, and limestone, can be used to replace a portion of Portland cement in concrete. SCMs can yield improved concrete with increased paste density, increased durability, lower heat of hydration, lower chloride permeability, reduced creep, increased resistance to chemical attack, lower cost, and reduced environmental impact. Pozzolans can react with calcium hydroxide released during cement hydration. Limestone can provide a filler effect and accelerate cement hydration. Some SCMs such as ground granulated blast furnace slag (GGBFS) have self-cementing properties.

Natural pozzolans such as volcanic ash, pumice, and other materials found in the earth can be activated to make them more pozzolanically active by heating/calcining to remove moisture and/or organic matter and/or grinding to reduce particle size. Both processes consume energy, with calcining typically requiring more energy than grinding. Due to the hardness of volcanic glasses, grinding natural pozzolans can be difficult. Milling apparatus such as vertical roller mills and horizontal roll presses may be incapable of grinding natural pozzolans because of the difficulty of maintaining a stable bed of materials.

Natural pozzolans can also be interground with Portland cement clinker to form Type 1P blended cement. Such interground blended cements are, however, notorious for having low reactivity and are often ground to much higher fineness than ordinary Portland cement (OPC) to offset low reactivity. While intergrinding naturally pozzolans with cement clinker can be performed in a single step and is therefore significantly less expensive and more efficient than separately processing OPC and natural pozzolan and then blending them together, interground blends typically underperform non-interground blends with separately processed components.

Accordingly, there remains a long-felt need to find better and more cost effective ways to activate natural pozzolans.

SUMMARY

Disclosed herein are activated natural pozzolans, natural pozzolan blends, cement-SCM compositions, and methods and systems for activating natural pozzolans, forming natural pozzolan blends, and forming cement-SCM compositions. Natural pozzolans, such as volcanic ash, pumice, perlite, other materials of volcanic origin, and other pozzolans of natural origin found in the earth, can be activated by intergrinding at least one natural pozzolan together with at least one mineral material, such as at least one granular mineral material and/or limestone.

In some embodiments an initially coarse or granular material (e.g., 1-3 mm or larger, such as 2 mm or larger, in size) is interground with a natural pozzolan, such as volcanic ash (e.g., that contains a significant quantity of particles less than 1 mm, 500 μm, or 200 μm in size), that might otherwise be difficult to grind in a vertical roller mill (VRM) or horizontal roll press that require the addition of an initially coarse or granular material to form a stable bed. For example, volcanic ash, tuff, pumice, or other natural pozzolan containing moisture, that has low surface area, or that is otherwise insufficiently reactive for use as a partial cement substitute in concrete, can be interground with the granular material to form an activated pozzolan or SCM blend having reduced moisture content, finer particle size, higher surface area, and higher pozzolanic reactivity.

By way of example and not limitation, the coarse or granular SCM can be granulated blast furnace slag (GBFS), steel slag, other metallurgical slag, limestone, fine or medium aggregates, partially ground shale, geologic materials, waste glass, glass shards, glass beads, basalt, sinters, ceramics, recycled bricks, recycled concrete, porcelain, used catalyst particles, refractory materials, other waste industrial products, sand, gypsum, bauxite, calcite, dolomite, granite, volcanic rock, volcanic glass, quartz, fused quartz, natural minerals. The natural pozzolan can be volcanic ash, trass, pumice, perlite, other natural pozzolan.

In some embodiments, an interground pozzolanic material can include two or more different types of materials interground together that can be blended with one or more coarser components. In some embodiments, a fine interground material can include one or more natural pozzolans interground with one or more initially coarse or granular materials. In some embodiments, a fine interground material can include one or more clinkers or granules (cementitious or non-cementitious) initially larger than about 1-3 mm interground with one or more finer materials smaller than about 1 mm. Intergrinding clinkers or granules with finer materials can be advantageous when using a modern mill that requires some percentage of clinkers or granules to be present to form a stable grinding bed (e.g., vertical roller mills, horizontal roll presses, and the like). The clinkers or granules may be metallurgical slag, limestone, aggregates, glass shards, recycled bricks or ceramics, or other geological materials. Although less preferred, hydraulic cement clinker can also be included as part of the granular component but is preferably less than 30%, less than 25%, less than 20%, less than 15%, less than 10%, less than 5%, less than 4%, less than 3%, less than 2%, or less than 1% of the total interground material.

In some embodiments, an activated pozzolan composition comprises an interground particulate blend formed by intergrinding an initially granular material with a natural pozzolan, wherein the initially granular material interground with the natural pozzolan is selected from the group consisting of limestone, granulated blast furnace slag, steel slag, metallurgical slag, fine aggregate, shale, geologic material, natural minerals, waste glass, glass shards, basalt, sinters, ceramics, recycled bricks, recycled concrete, refractory materials, other waste industrial products, and sand.

In some embodiments, a method of manufacturing an activated natural pozzolan comprises intergrinding a granular material and/or limestone with one or more natural pozzolans to form an activated interground pozzolan composition. The natural pozzolan may initially have a moisture content (e.g., of at least 3% prior to intergrinding) and the interground particulate material may have a reduced moisture content (e.g., less than 0.5%).

In some embodiments, a system of manufacturing an activated natural pozzolan composition comprises one or more milling apparatus configured to intergrind a granular material and/or limestone and one or more natural pozzolans to form an activated interground pozzolan composition. The milling apparatus may generate and/or involve the input of heat, which can advantageously reduce the moisture content of the natural pozzolan during grinding.

In some embodiments, the interground particulate material can be used to replace a portion of cement and/or pozzolan normally used in concrete or other cementitious composition. The interground particulate material can be preblended with one or more additional SCMs and/or OPC prior to use. For example, the interground particulate material can be blended, without intergrinding, with an auxiliary particulate component, such OPC, magnesium cement, aluminate cement, bottom ash, fly ash, GGBFS, steel slag, limestone, and the like.

These and other advantages and features of the invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only illustrated embodiments of the invention and are therefore not to be considered limiting of its scope. The invention will be described and explained with additional specificity and detail through the use of the accompanying drawings in which.

DETAILED DESCRIPTION OF THE PREFERRED EMBODIMENTS

I. Introduction

Disclosed herein are activated pozzolan compositions for use in making concrete and other cementitious compositions and methods and systems for manufacturing.

Intergrinding processes can be used to manufacture a blended SCM material, such as an initially coarse granular SCM that is initially 1-3 mm in size with an initially fine SCM powder that might otherwise be difficult to grind in a vertical roller mill (VRM) or horizontal roll press. To form a stable bed, the initially coarse granular SCM is used to form a stable bed and interground with the finer SCM. For example, a volcanic ash or natural pozzolan having a moisture content or which is otherwise insufficiently reactive can be interground with a granular material to form an activated pozzolan or SCM blend having reduced moisture and finer particle size. The coarse granular SCM can be granulated blast furnace slag, steel slag, other metallurgical slags, pumice, limestone, dolomite, fine aggregates, glass shards, recycled bricks or ceramics, basalt, shale, tuff, trass, or other geologic material.

If the mill used to intergrind cement clinker and initially moist SCM generates sufficient heat, such as a ball mill or VRM, the heat may be sufficient to prevent moisture released from the initially moist SCM from reacting with and prematurely hydrating a portion of ground cement clinker. Alternatively, grinding aids, such as alkyl amines or alcohol amines, can form a coating that protects or shield cement particles from prematurely hydrating. In some cases, it may be desirable or necessary to at least partially pre-dry the initially moist SCM to prevent premature hydration of ground cement particles.

On the other hand, activating natural pozzolans, even which contain substantial moisture (at least 3%, 5%, 7.5%, 10%, 15%, 20%, or 25%) by intergrinding with coarse granular SCM materials instead of cement clinker prevents moisture released from the natural pozzolan to undesirably and prematurely react with cement clinker, which can reduce cement reactivity and ultimate strength.

Figure 1A:
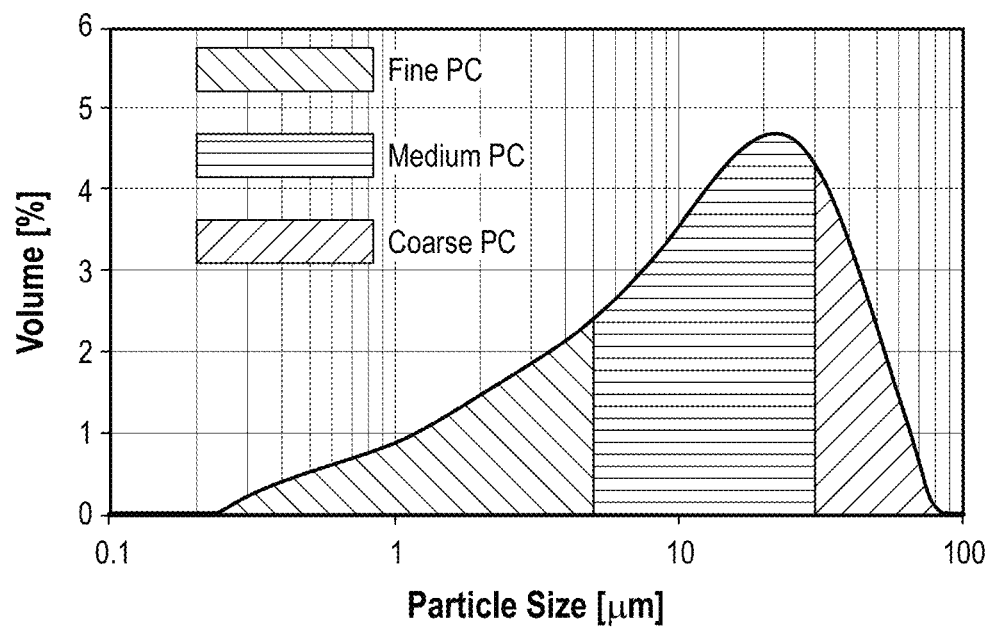
FIGS. 1A and 1B are illustrative particle size distribution (PSD) charts of exemplary ordinary Portland cement (OPC) subdivided to show fine, medium, and coarse fractions.

As used herein, the term "ordinary Portland cement" ("OPC") refers to Type I, II and V cements, according to ASTM C-150, and other cements having similar PSDs. By way of example, FIG. 1A is a PSD chart showing data measured by a laser diffraction technique of a commercially available Type I/II OPC having a Blaine fineness of 376 $m^2/kg$ (as reported by its manufacturer). The PSD chart is further subdivided into three regions or fractions designated as "fine" (e.g., <5 μm), "medium" (e.g., 5-30 μm), and "coarse" (e.g., >30 μm). It will be appreciated that these particle size ranges and cutoffs are for illustration and comparison purposes and should not be taken as absolute or necessarily definitional. Other numeric ranges and cutoffs can be used to designate fine, medium, and coarse fractions of cement or cement-SCM blends. For example, the cutoff between the "fine" and "medium" fractions can be any integer or decimal number between 3-15 μm. Similarly, the cutoff between the "medium" and "coarse" fractions can be any integer or decimal number between 10-40 μm. For example, if the cutoff between fine and medium fractions were set at 8 μm and the cutoff between the medium and coarse fractions were set at 24 μm, particles below 8 μm would be "fine", particles between 8-24 μm would be "medium", and particles above 24 μm would be "coarse".

Figure 1B:
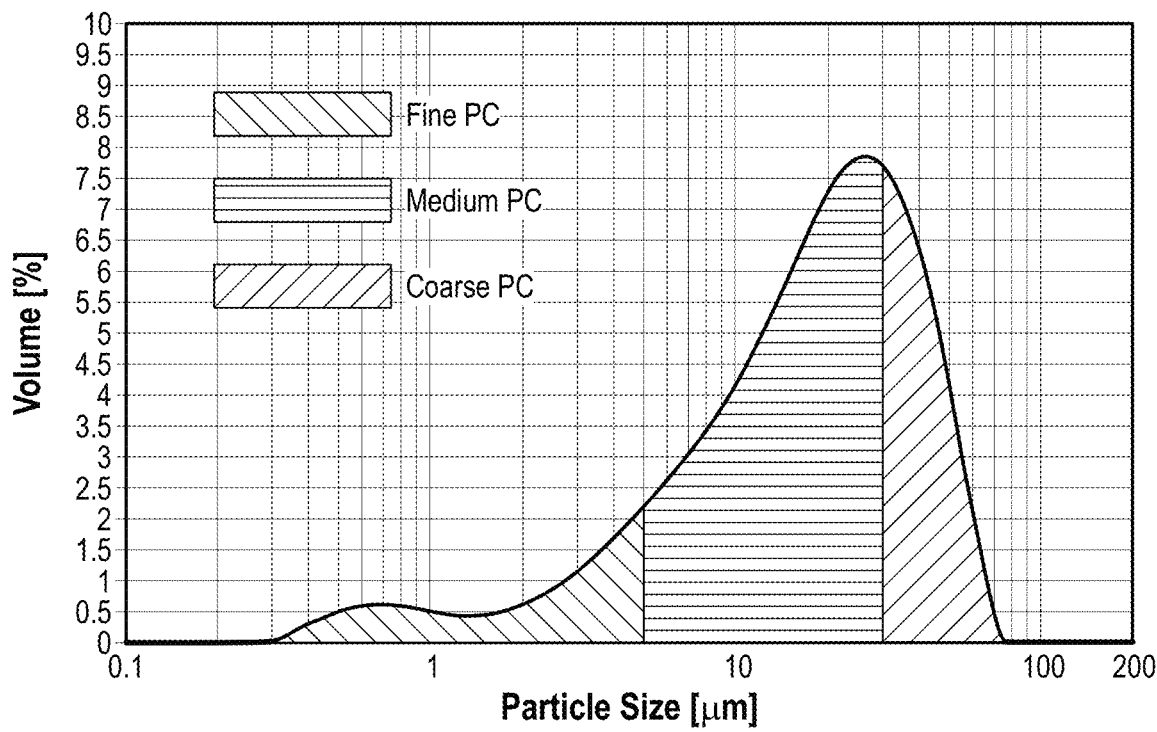

FIG. 1B is a PSD chart showing data measured by a Malvern Mastersizer 2000 of a ground cement clinker material milled using a vertical roll mill (VRM) to a d90 within a typical range of about 40-45 μm. The raw unground clinker was obtained from Drake Cement, Paulen, Ariz., and the VRM was manufactured by Gebr. Pfeiffer, located in Kaiserslautern, Germany. The PSD of the ground cement clinker shown in FIG. 1B is steeper than the PSD of the OPC shown in FIG. 1A, with a d90 of about 43.4 μm, a d50 of about 18.8 μm, and a d10 of about 3.8 μm). The ground cement clinker in FIG. 1B has fewer "fine" particles than the OPC of FIG. 1A, as illustrated by the smaller cross-hatched area designed as "fine". Nevertheless, both Portland cement materials have a typical d90 (e.g., about 40-45 μm) and also a typical d50 (e.g., about 18-20 μm) and therefore contain a substantial proportion of coarse cement particles that may not fully hydrate, particularly at lower water-to-cement ratios (w/c). Steeper PSDs are typical of OPC made using a VRM and other modern, more efficient grinding apparatus such as a horizontal roll press. Older, less efficient grinding apparatus such as a ball mill produce broader PSD cement. OPC made using modern mills having a PSD and considered too narrow is sometimes further processed using a ball mill to produce a higher proportion of fine cement particles and thereby flatten the PSD curve.

Cement-SCM compositions disclosed herein can be made using hydraulic cement and SCM materials known in the art of cement and concrete manufacture. Examples of cement fractions, SCM fractions, binary, ternary and quaternary cement-SCM blends and compositions that can be made according to the methods and systems disclosed herein are found in U.S. Pat. Nos. 7,799,128, 7,972,432, 8,323,399, 8,974,593, 9,067,824, 8,414,700, 8,377,201, 8,551,245 and 9,102,567, the disclosures of which are incorporated herein in their entirety.

The terms "hydraulic cement" and "cement", as used herein, include Portland cement and similar materials that contain one or more of the four clinker materials: $C_3S$ (tricalcium silicate), $C_2S$ (dicalcium silicate), $C_3A$ (tricalcium aluminate), and $C_4AF$ (tetracalcium aluminoferrite). Hydraulic cement can also include ground granulated blast-furnace slag (GGBFS) and other slags having a relatively high CaO content (which may also qualify as SCMs), white cement, calcium aluminate cement, high-alumina cement, magnesium silicate cement, magnesium oxychloride cement, oil well cements (e.g., Type VI, VII and VIII), and combinations of these and other similar materials.

The terms "supplementary cementitious material" and "SCM" shall include any material commonly understood in the industry to constitute materials that can replace a portion of hydraulic cement in concrete, either in blended cements or added by end users when making concrete or other cementitious materials. The terms "Supplementary cementitious material" and "SCM", as used herein, shall also broadly encompass any material that can be or has been processed in such a way as to capable of replacing a portion of Portland or other hydraulic cement in concrete. Non-limiting examples of SCMs include highly reactive materials (e.g., GGBFS), moderately reactive materials (e.g., Class C fly ash, steel slag, silica fume, and metakaolin), lower reactive materials (e.g., Class F fly ash, calcined clays, natural pozzolans, ground pumice, ground glass, and metastable forms of $CaCO_3$), and filler materials (e.g., ground limestone, ground quartz, and precipitated $CaCO_3$). There are claims that some unreactive filler materials, such as ground limestone, ground quartz, and precipitated $CaCO_3$, can become or be made to be reactive under certain circumstances.

In some embodiments, a fine interground particulate component can include two or more different types of materials interground together that can be blended with one or more coarser components. In some embodiments, a fine interground material can include one or more hydraulic cement clinkers interground with one or more SCMs. In other embodiments, a fine interground material can include one or more types of clinkers or granules initially larger than about 1-3 mm (e.g., cement, metallurgical slags, limestone, pumice, coal ash, sinters, waste glass, natural pozzolans, bricks, ceramics, recycled concrete, refractory materials, other waste industrial products, sand, natural minerals interground with one or more finer SCMs having an initial particle size<1 mm (e.g., volcanic ash, natural pozzolans, fly ash, waste fines from aggregate processing, red mud).

In some embodiments, at least one of the SCM fraction of the fine interground particulate component or the coarse SCM particles of the coarse particulate component may comprise one or more SCM materials selected from coal ashes, slags, natural pozzolans, ground glass, and non-pozzolanic materials. By way of example, coal ashes can be selected from fly ash and bottom ash, slags can be selected from ground granulated blast furnace slag, steel slag, and metallurgical slag containing amorphous silica, natural pozzolans can be selected from natural pozzolanic deposits, volcanic ash, metakaolin, calcined clay, trass, and pumice, ground glass can be selected from post-consumer glass and industrial waste glass, and non-pozzolanic materials can be selected from limestone, metastable calcium carbonate produced by reacting $CO_2$ from an industrial source and calcium ions, precipitated calcium carbonate, crystalline minerals, hydrated cements, and waste concrete.

In some embodiments, an optional auxiliary particulate components can be blended with the interground particulate composition. The optional auxiliary particulate component can be virtually any hydraulic cement, SCM material, or blend thereof that has not been interground with the interground particulate composition.

As used herein, the term "fine interground particulate component" may include a cement-SCM material that is made, at least in part, by intergrinding hydraulic cement (e.g., Portland cement clinker) with one or more SCMs (e.g., slags, pozzolans, ashes, and fillers).

Alternatively, the term "fine interground particulate component" includes first and second SCM components and is made, at least in part, by intergrinding a coarse SCM material (e.g., clinker or granules at least 1-3 mm in size, such as metallurgical slag, limestone, geologic minerals, recycled pozzolans, e.g., glass, bricks, ceramics, etc.) with one or more other SCMs (e.g., which can be coarse or fine). As a general rule with few, if any, exceptions, the component made by intergrinding two or more different materials will be significantly different than the material produced by separately processing and then blending the same two or more different materials together.

Moreover, intergrinding is believed to form a more intimate and uniformly blended mixture of two or more different components compared to separate processing and simply blending. While separate processing and simple blending of coarse particles to yield a coarse blend may achieve similar blending uniformity as intergrinding, that is not the case with very fine materials, which contain orders of magnitude more particles than coarse materials. The extremely large number of particles coupled with more particle-particle interactions in the case of fine particulate materials, make blending uniformity much more difficult. Thus, intergrinding two or more components to yield a finely ground blend is far more likely to yield an intimate and uniformly blended mixture than separate processing and simple mixing of the same fine materials.

II. Activation of Natural Pozzolans

A. Intergrinding to Activate Natural Pozzolan

FIGS. 2B, 3B, 4A, and 4B are PSD charts showing data measured by a Malvern Mastersizer 2000 of example interground particulate compositions containing an activated natural pozzolan. The interground material of FIG. 4B can be used as a component to make cement-SCM compositions. It can be the end product, as disclosed herein, as it is includes an activated natural pozzolan made without calcination and without intergrinding with cement clinker.

Figure 2A:
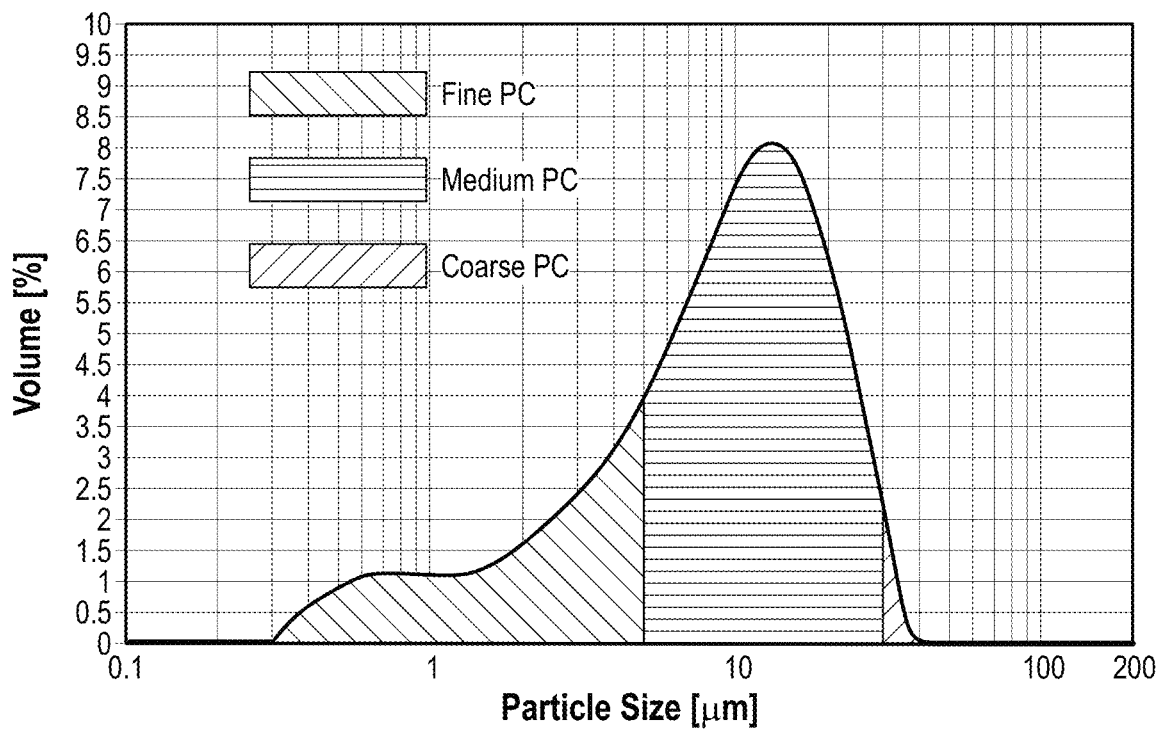
FIG. 2A is PSD chart of a finely ground cement clinker subdivided to show fine, medium, and coarse fractions.

For comparison purposes, FIG. 2A is a PSD chart, illustratively subdivided with fine, medium, and coarse fractions, showing data measured by a Malvern Mastersizer 2000, of a finely ground cement material consisting of 100% Portland cement made from the same batch of Drake cement used for the material of FIG. 1B and milled using the same Pfeiffer VRM. Interestingly, the PSD chart of FIG. 2A has a shape very similar to the PSD chart of FIG. 1B even though the two cements have very different d90s. The finely ground cement material has a d90 of about 22.1 µm, a d50 of about 9.9 µm, and d10 of about 1.8 µm. Compared to the PSDs of the conventional Portland cement materials shown in FIGS. 1A and 1B, the fine cement of FIG. 2A has a substantially lower d90, higher reactivity, and substantially fewer particles, if any, that will not fully hydrate within a standard defined time period (e.g., 28 days). This can be readily seen by comparing the areas under the PSD curves corresponding to the "coarse" Portland cement fraction which, for illustrative purposes, was selected here to be particles>30 µm.

Figure 2B:
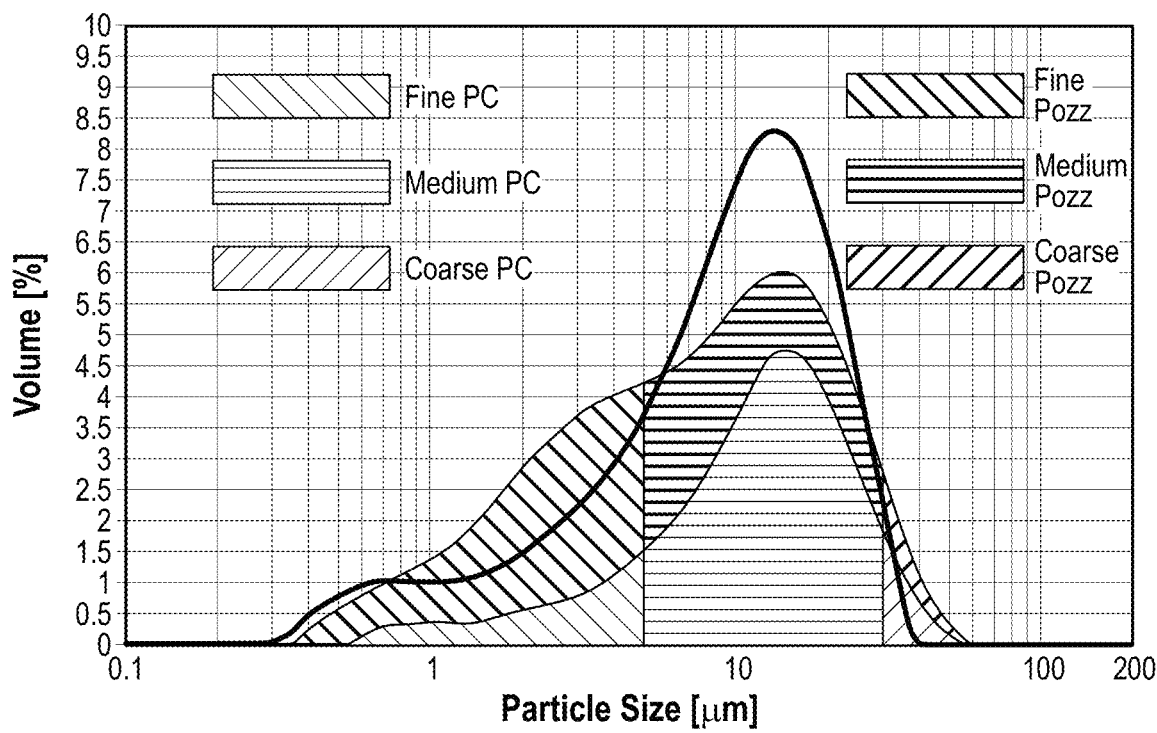
FIG. 2B is a PSD chart comparing the PSD of the finely ground cement clinker of FIG. 2A with the PSD of a finely interground cement clinker and natural pozzolan having an approximate bimodal PSD, with estimated proportioning of the cement and pozzolan fractions within the fine, medium, and coarse fractions.

FIG. 2B graphically illustrates and compares the PSDs of the 100% ground Portland cement clinker of FIG. 2A (bold line curve) and a 50:50 (w/w) interground blend (thin line curve) of the same batch of Drake cement clinker and a natural pozzolan, also obtained from Drake Cement. The PSD chart in FIG. 2B of the 50:50 blend is apparently bimodal and is further subdivided to illustratively show fine, medium, and coarse fractions of each cement and pozzolan fraction. For illustration purposes, the PSD curve of FIG. 2A, which is overlaid over the PSD chart for the 50:50 blend, was used to extrapolate and estimate the relative proportions of fine cement and pozzolan within the fine, medium, and coarse fractions. The PSD curve of the cement fraction in FIG. 2B was assumed to have similar shape as the PSD curves of FIGS. 1B and 2A, with the apparent bimodal feature being attributed to the different grinding characteristics of the softer natural pozzolan interground with the cement clinker.

The clinker and pozzolan were initially pre-blended and then milled using the same Pfeiffer VRM. The interground blend has a d90 of about 24.1 µm, a d50 of about 7.9 µm, and a d10 of about 1.5 µm. The PSD of the 50:50 (w/w) interground blend appears to have an approximate bimodal shape, which suggests a non-uniform distribution of cement and pozzolan particles within the interground blend. Because the energy required to produce the 50:50 (w/w) interground blend shown in FIG. 2B was significantly lower and the throughput was significantly higher than the energy and throughput for the finely ground Portland cement clinker material of FIG. 2A, it is postulated that this may be due to the easier grindability of the natural pozzolan as compared to the cement clinker. This observation, coupled with the fact that the natural pozzolan was finer to begin with, suggests that the finer particles in the 50:50 interground blend (e.g., below the d50) are predominately composed of natural pozzolan particles and the coarser particles (e.g., above the d50) are predominately composed of Portland cement particles. Classifying the interground blend at about 8 µm using a classifier capable of making sharp cuts at this particle size, such as a high efficiency air classifier from Netzsch, and chemically analyzing and comparing the fine and coarse fractions would confirm this.

Figure 3A:
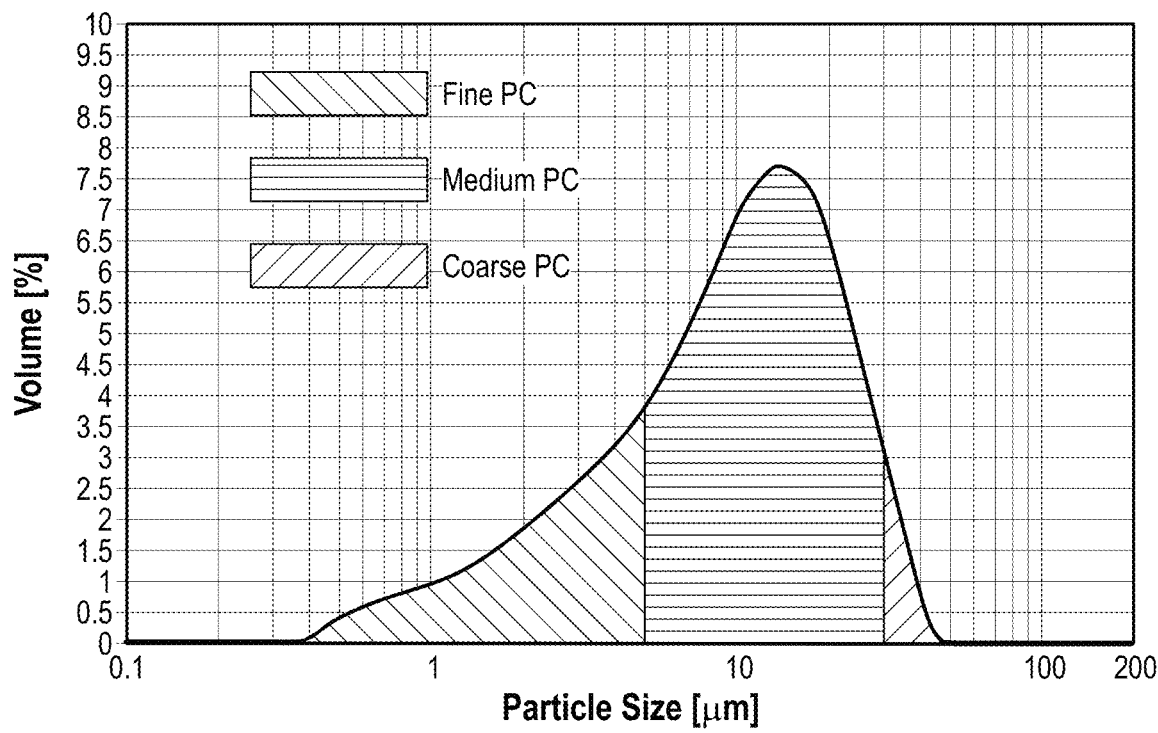
FIG. 3A is a PSD chart of another finely ground cement material made using cement clinker and subdivided to show fine, medium, and coarse fractions.

For comparison purposes, FIG. 3A is a PSD chart, illustratively subdivided to show fine, medium, and coarse fractions, showing data measured by a Malvern Mastersizer 2000 of another finely ground cement material made from Drake cement using the Pfeiffer VRM. The finely ground cement material has a d90 of about 24.4 µm, a d50 of about 10.2 µm, and d10 of about 2.1 µm. Compared to the PSDs of the conventional Portland cement materials shown in FIGS. 1A and 1B, the fine cement material of FIG. 3A has a substantially lower d90, higher reactivity, and substantially fewer particles that will not fully hydrate at 28 days.

Figure 3B:
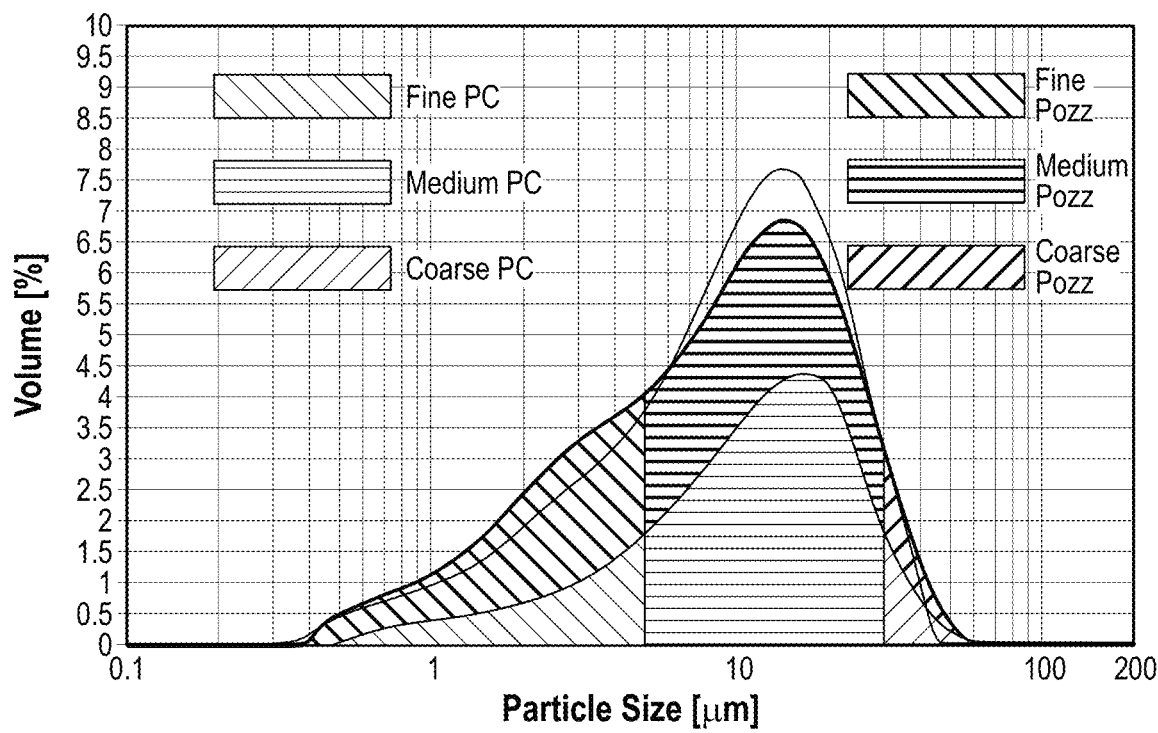
FIG. 3B is a PSD chart comparing the PSD of the finely ground cement material of FIG. 3A with the PSD of another finely interground cement clinker and natural pozzolan having an approximate bimodal PSD, with estimated proportioning of the cement and pozzolan fractions within the fine, medium, and coarse fractions.

FIG. 3B graphically illustrates and compares the PSDs of the finely ground cement material of FIG. 3A (thin line curve) and another 50:50 (w/w) interground blend (bold line curve) of Drake cement clinker and Drake natural pozzolan. The clinker and pozzolan were initially pre-blended and then milled using the Pfeiffer VRM. The interground blend has a d90 of about 24.6 µm, a d50 of about 9.2 µm, and a d10 of about 1.8 µm. Similar to FIG. 2B, the PSD of the 50:50 (w/w) interground blend in FIG. 3B appears to have an approximate bimodal shape, although not as distinctive as in FIG. 2B, which again suggests a non-uniform distribution of cement and pozzolan particles within the interground blend. It is postulated that the finer particles in the 50:50 interground blend (e.g., below the d50) are predominately composed of natural pozzolan particles and the coarser particles (e.g., above the d50) are predominately composed of Portland cement particles. For illustration purposes, the PSD curve of FIG. 3A, which is overlaid over the PSD chart for the 50:50 blend, was used to extrapolate and estimate the relative proportions of cement and pozzolan within the fine, medium, and coarse fractions. The PSD curve of the cement fraction in FIG. 3B was assumed to have similar shape as the PSD curves of FIG. 3A, with the apparent bimodal feature being attributed to the different grinding characteristics of the softer natural pozzolan interground with the cement clinker. Classifying the interground blend at about 9 μm using a classifier capable of making sharp cuts at this particle size and chemically analyzing and comparing the fine and coarse fractions would confirm this.

Figure 3C:
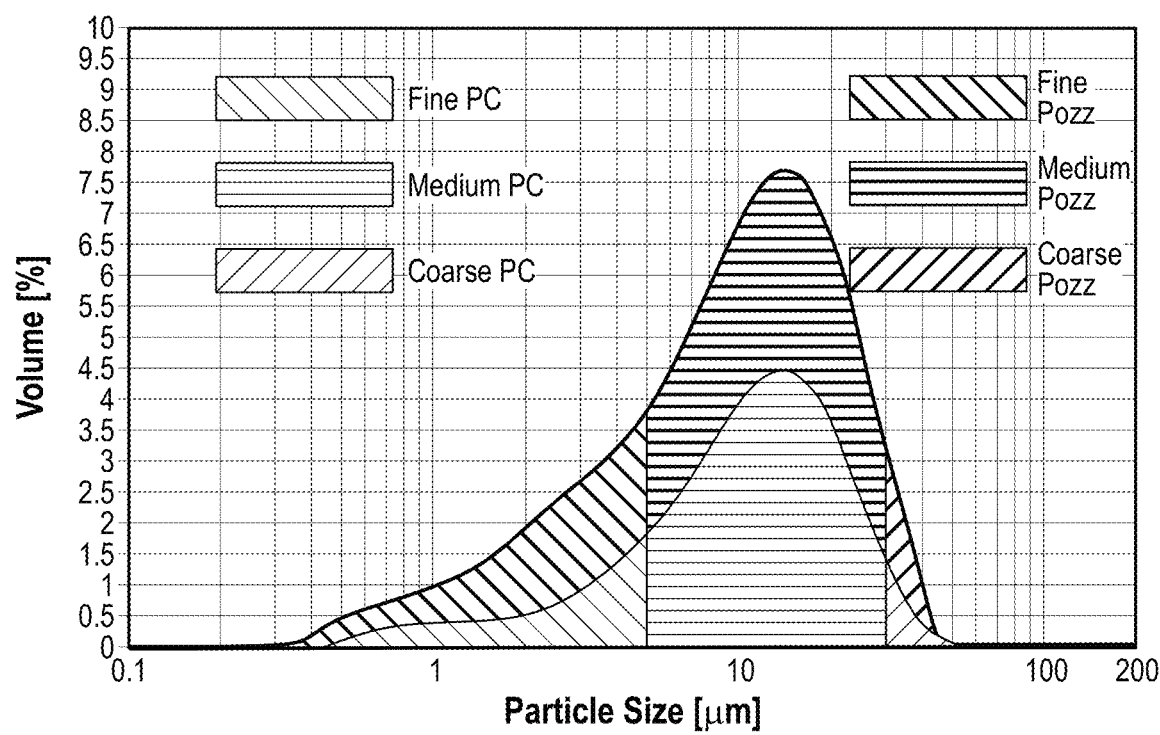
FIG. 3C is a PSD chart of a fine interground cement clinker and natural pozzolan, with estimated proportioning of the cement and pozzolan fractions within the fine, medium, and coarse fractions.

FIG. 3C is a PSD chart of an interground blend of cement clinker and Drake natural pozzolan that does not have an apparent bimodal shape. Nevertheless, the shape of the PSD curve of the cement fraction was assumed to have the same shape as the PSD curves in FIGS. 1B and 2A for the same cement material. On this assumption, FIG. 3C is subdivided between cement and pozzolan materials throughout the PSD curve and still shows a higher preponderance of fine pozzolan particles in the fine particle region and a higher preponderance of cement particles in the medium and coarse particle regions even without an apparent bimodal distribution within the overall interground blend.

Figure 4A:
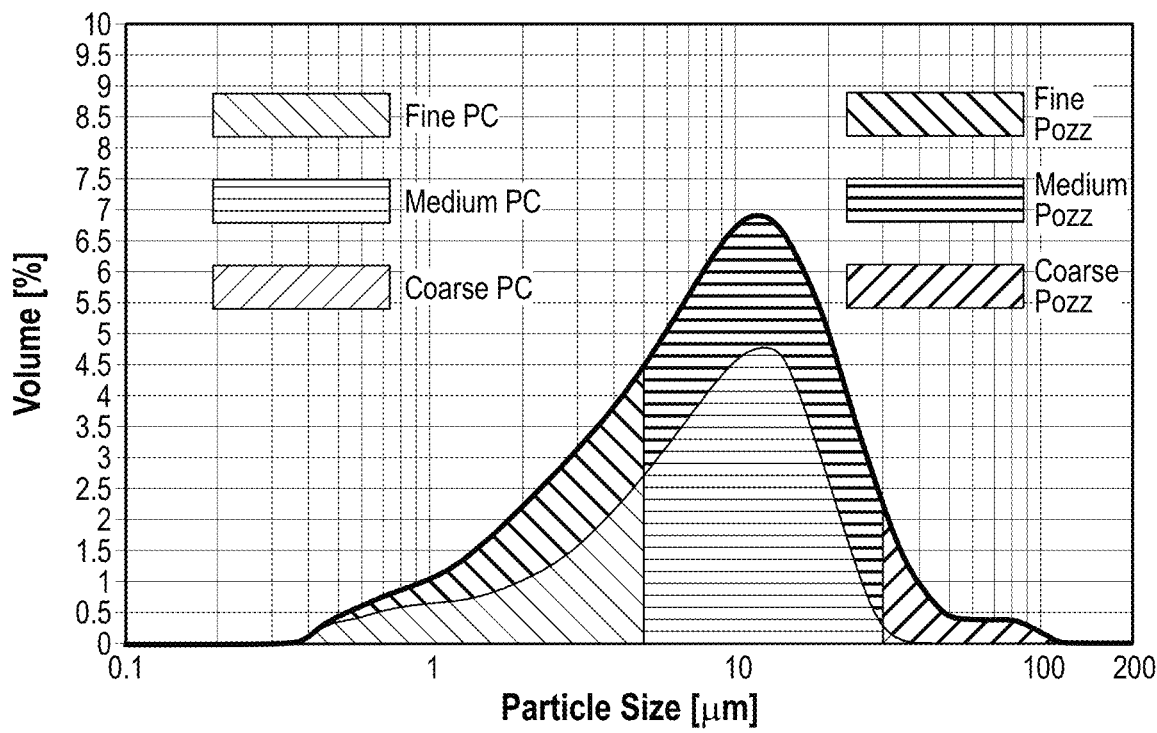
FIG. 4A is graph illustrating the PSD of another finely interground cement clinker and natural pozzolan without an apparent bimodal PSD, with estimated proportioning of the cement and pozzolan fractions within the fine, medium, and coarse fractions.

FIG. 4A is a chart PSD of a 50:50 (w/w) interground blend of Drake cement and a different natural pozzolan (i.e., "west desert ash") obtained from Jack B. Parsons Ready Mix, located in Utah, a subsidiary of Oldcastle, Inc. The clinker and natural pozzolan were initially pre-blended and then milled using the Pfeiffer VRM. This interground blend has a d90 of about 24.0 μm, a d50 of about 8.8 μm, and a d10 of about 1.9 μm. The PSD of this interground blend does not appear to have a bimodal shape, which might suggest a fairly uniform distribution of cement and natural pozzolan particles throughout the interground blend. Alternatively, because the energy required to produce the 50:50 (w/w) interground blend shown in FIG. 4A was higher and the throughput lower than the energy and throughput for the interground blends of FIGS. 2B and 3B, it is possible this natural pozzolan is harder to grind than cement clinker. In such case, the interground blend might possibly have a higher preponderance of cement particles in the fine particle region and a higher preponderance of pozzolan particles in the coarse particle region. For purely illustrative purposes, the PSD chart is subdivided to show the relative preponderance cement and pozzolan particles within fine, medium, and coarse regions of the PSD curve.

Figure 4B:
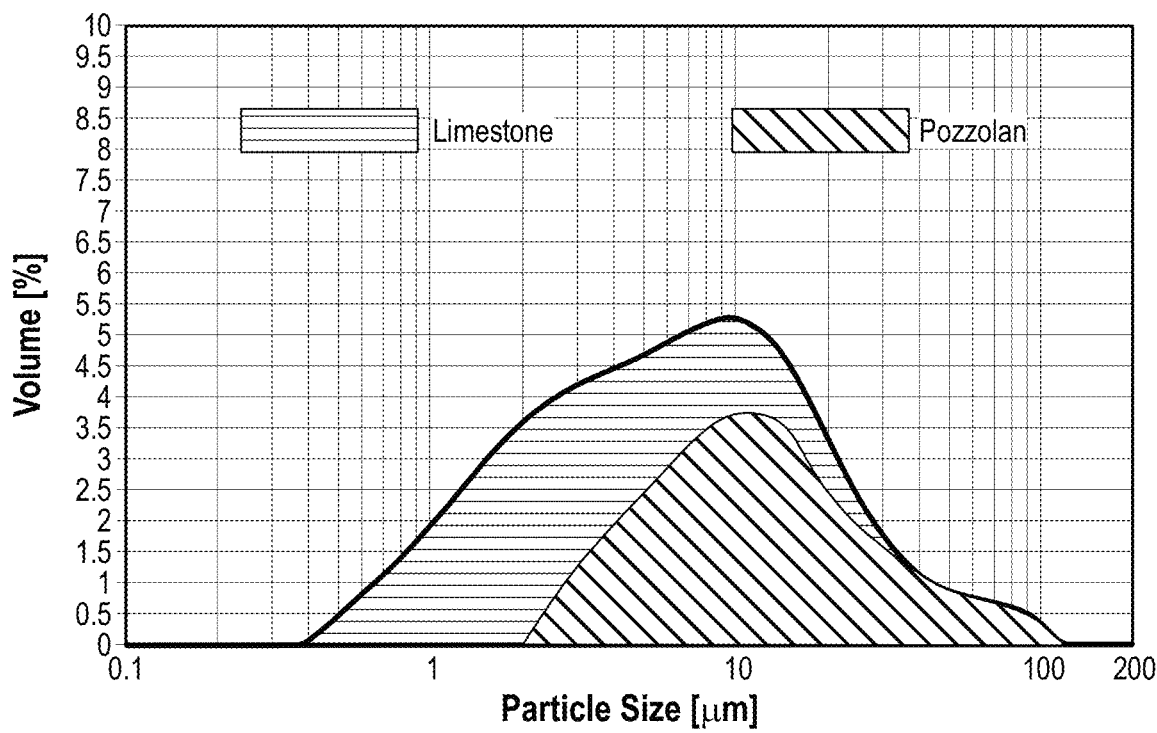
FIG. 4B is graph illustrating the PSD of an interground limestone and natural pozzolan having an approximate bimodal PSD, with estimated proportioning of the limestone and pozzolan fractions within the fine, medium, and coarse fractions.

FIG. 4B is a PSD chart of a 50:50 (w/w) interground blend of limestone and the Parson natural pozzolan. The limestone and natural pozzolan were initially pre-blended and then milled using the same Pfeiffer VRM. The interground blend of limestone and natural pozzolan has a d90 of about 24.2 μm, a d50 of about 6.3 μm, and a d10 of about 1.4 μm. The PSD of this interground blend has an approximate bimodal shape, which suggests a non-uniform distribution of limestone and pozzolan particles within the interground blend. Because limestone is generally softer than cement clinker, because this natural pozzolan appears to be as hard or harder than cement clinker, and because the PSD is broadened compared to the other illustrated PSDs, it is hypothesized that the finer particles in this 50:50 interground blend (e.g., below the d50) are predominately composed of limestone particles and the coarser particles (e.g., above the d50) are predominately composed of natural pozzolan particles. The PSD chart was subdivided for illustrative purposes based on an extrapolation of the PSD curves shown in FIGS. 2A-4B. Classifying the blend at about 8 μm using a classifier capable of making sharp cuts at this particle size, such as a high efficiency air classifier from Netzsch, and chemically analyzing and comparing the fine and coarse fractions might confirm this. The inclusion of finely ground limestone particles can beneficially offset the retardation effect of many pozzolans in cement-SCM blends.

Figure 5A:
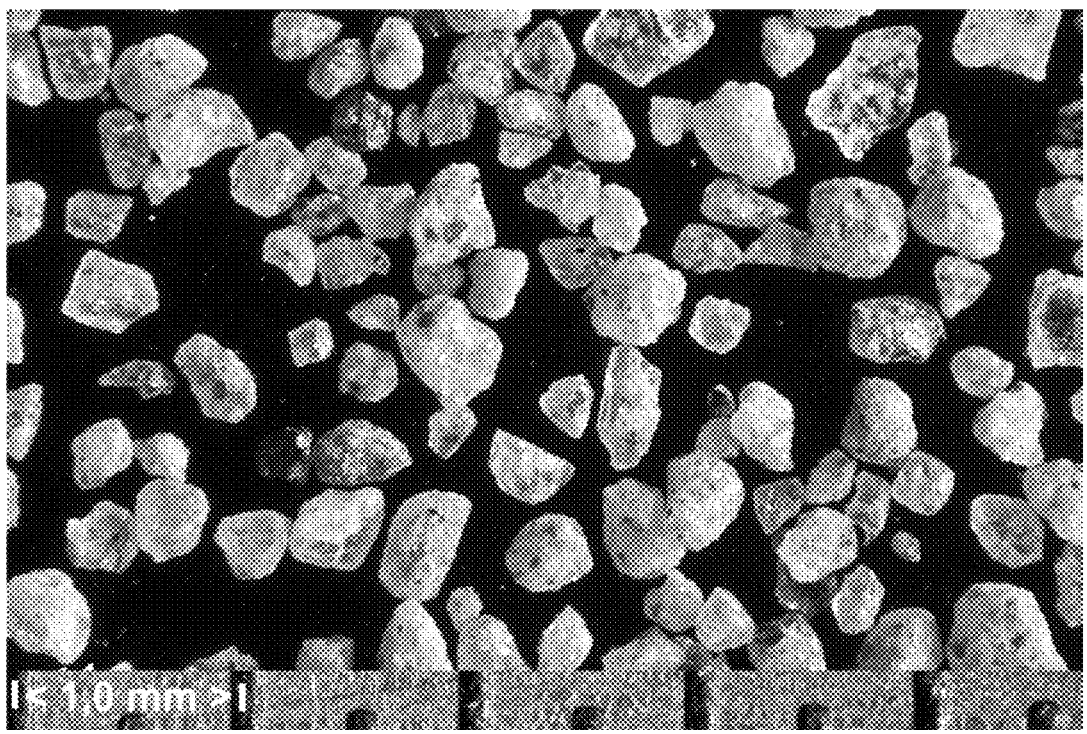
FIG. 5A is a photograph made using a conventional microscope of sieved natural pozzolan particles that are opaque and have a more rounded morphology.

FIG. 5A is a photograph made using a conventional microscope of sieved coarse natural pozzolan particles provided by Drake cement, which is the pozzolan used to make the fine interground blended materials described with reference to FIGS. 2B, 3B, and 3C. The coarse particles appear to be substantially opaque with a generally rounded and somewhat globular morphology. Coarse SCM particles having a generally rounded morphology should in theory provide higher fluidity and lower water demand compared to more jagged particles. Nevertheless, because the pozzolan particles are not perfect spheres, they have some uneven surface that might provide for improved pozzolanic reactivity. Intergrinding with cement to make a fine interground particulate material as disclosed herein would likely significantly increase their pozzolanic reactivity.

Figure 5B:
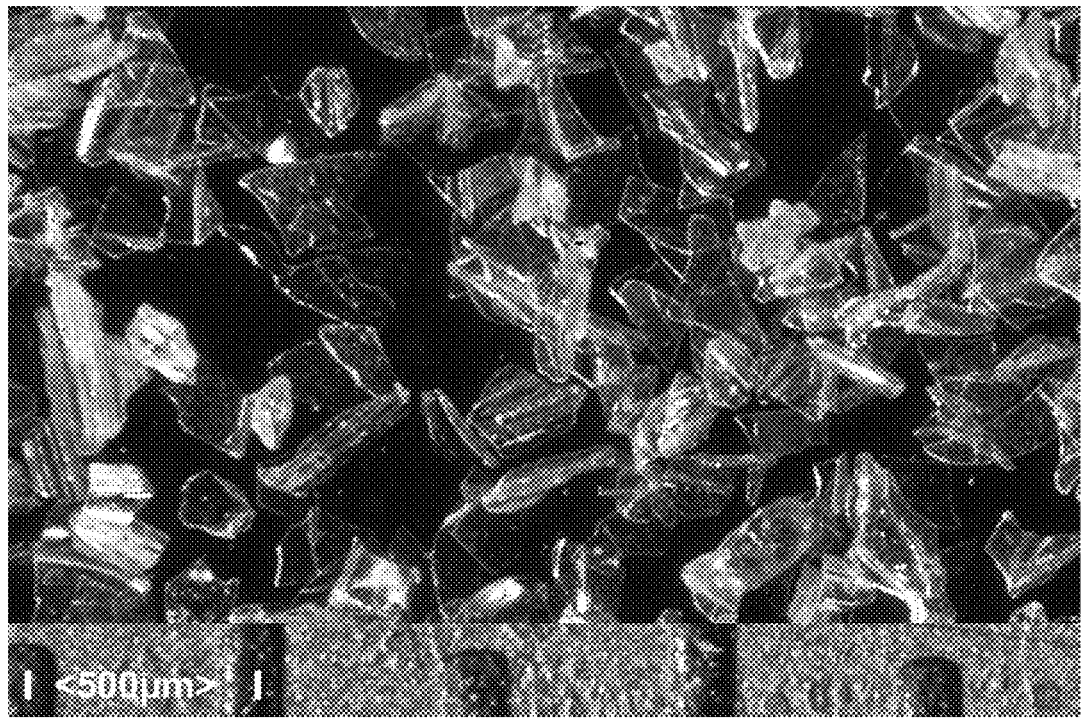
FIG. 5B is a photograph made using a conventional microscope of sieved natural pozzolan particles that have a glassy appearance and a jagged and flat morphology.

FIG. 5B is a photograph made using a conventional microscope of sieved coarse natural pozzolan particles provided by Jack B. Parsons Ready Mix, which is the pozzolan used to make the fine interground blended materials described with reference to FIGS. 4A and 4B. The coarse particles have a glassy, more transparent appearance, suggesting an amorphous rather than crystalline structure and a jagged and more flat morphology. The glassy and jagged nature of these particles might increase their pozzolanic reactivity compared to spherical pozzolanic particles, such as fly ash, of similar size. However, their flat, plate-like morphology may reduce fluidity and increase water demand compared to similarly sized particles having a rounded morphology. Some amount of grinding may produce a coarse particulate SCM material for use in making cement-SCM blends as disclosed herein. Intergrinding with cement to make a fine interground particulate material as disclosed herein would likely significantly increase their pozzolanic reactivity and reduce water demand.

In some embodiments, the fine interground particulate component can have a d90 equal to or less than about 45 μm, 42.5 μm, 40 μm, 37.5 μm, 35 μm, 32.5 μm, 30 μm, 27.5 μm, 25 μm, 23 μm, 21 μm, or 20 μm. In such cases, the d90 can be selected so as to be greater than about 10 μm, 11 μm, 12 μm, 13 μm, 14 μm, 15 μm, 17 μm, or 19 μm. In other embodiments, the fine interground particulate component has a d90 equal to or less than about 25 μm, 23 μm, 21 μm, 19 μm, 17.5 μm, 16 μm, 15 μm, 14 μm, 13 μm, 12 μm, or 11 μm. In such cases, the d90 can be selected so as to be equal to or greater than 5 μm, 6 μm, 7 μm, 8 μm, 9 μm, or 10 μm.

In some embodiments, the fine interground particulate component can have a d10 equal to or less than about 5 μm, 4.5 μm, 4 μm, 3.5 μm, 3 μm, 2.75 μm, 2.5 μm, 2.25 μm, 2 μm, 1.75 μm, 1.5 μm, 1.35 μm, 1.25 μm, 1.15 μm, 1.07 μm, or 1 μm. In some embodiments, the d10 of the fine interground particulate component can be equal to or greater than about 0.2 μm, 0.25 μm, 0.3 μm, 0.35 μm, 0.4 μm, 0.5 μm, 0.6 μm, 0.7 μm, 0.8 μm, 0.9 μm, or 1.0 μm.

In some embodiments, the fine interground particulate component can have a d50 equal to or less than about 18 µm, 16 µm, 14.5 µm, 13 µm, 12 µm, 11 µm, 10 µm, 9 µm, 8 µm, or 7 µm and/or equal to or greater than 4 µm, 5 µm, 6 µm, 7 µm, 8 µm, 9 µm, 10 µm, 11 µm, or 12 µm.

In some embodiments, the natural pozzolan fraction of the fine interground particulate component comprises at least about 5%, 10%, 15%, 20%, 25%, 35%, 40%, or 45% and less than about 90%, 80%, 70%, 60%, or 50% by weight of the fine interground particulate component and/or the initial clinker or granular material fraction of the fine interground particulate component comprises at least about 10%, 20%, 30%, 40%, or 50% and less than about 95%, 90%, 85%, 80%, 75%, 70%, 65%, or 55% by weight of the fine interground particulate component.

A separately processed auxiliary particulate component can be blended with the interground particulate composition to form a blend. The auxiliary particulate component can be OPC, other hydraulic cement, or SCM. Differences in the grindability of multiple materials can cause differences in the PSD, which can be particularly problematic and difficult to control when the grindability of one or more of the materials fluctuates unpredictably over time. A particulate blend having a broader PSD can be provided by blending a fine interground particulate component with an auxiliary particulate component that is coarser than the fine interground particulate component.

In some embodiments, cement-SCM compositions may include at least one auxiliary particulate component, which is advantageously not interground with the fine interground particulate component. The auxiliary particulate component can be one or more of commercially available hydraulic cements, such as OPC, or commercially available SCMs, such as fly ash (Class C and/or Class F), GGBFS, metakaolin, silica fume, rapid hardening cement, supersulfated cement, magnesium cement, aluminate cement, low $CO_2$ cement, low C3S and high C2S cement, calcium salt, magnesium salt, or geopolymer cement.

In some embodiments, the auxiliary particulate component may include an auxiliary SCM material, such as for example, a very fine particulate SCM material having a d90 less than the d90 of the fine interground component and/or a d10 less than the d10 of the fine interground component. Examples include any of the various micro silica materials known in the art, such as silica fume, which is an industrial byproduct formed during the manufacture of silicon and ferrosilicon materials. A very fine auxiliary component may be desirable when the fine interground particulate component is deficient in the quantity of very fine particles, particularly very fine SCM particles (e.g., below 2 µm, which are generally more desirable than cement particles below 2 µm; very fine cement particles increase water demand and cement paste porosity while very fine SCM particles can reduce water demand and reduce paste porosity).

In some embodiments, the auxiliary particulate component may include an auxiliary SCM material containing coarse SCM particles having a d90 greater than the d90 of the fine interground particulate component. In some cases, the d10 of the auxiliary particulate component can be greater than the d10 of the fine interground particulate component. The auxiliary particulate component may comprise ultra-coarse particles, such as unreactive fillers such as ground limestone, ground recycled concrete, quartz, minerals, bottom ash, crystalline metallurgical slags, or other industrial waste materials that have little or no reactivity and are well suited as a non-reactive filler.

Activated natural pozzolan compositions can be made using commercially available milling, separating and blending apparatus known in the art, sometimes with modification in order to obtain blends and compositions having a desired PSD. Non-limiting examples of milling apparatus include vertical roller mills, high pressure grinding rolls, horizontal roll presses, ball mills, rod mills, hammer mills, jaw mills, Raymond mills, jet mills, dry bead mills, ultrasonic fracturing mills, and the like. Non-limiting examples of separating apparatus include stand-alone classifiers, classifiers integrated with a vertical roller mill, and sieving apparatus. Non-limiting examples of blending apparatus include planetary mixers, dry rotating mixers, dry stirring apparatus, dry shakers, and concrete mixing apparatus, such as concrete mixing trucks and batch plant mixers.

In order to ensure that the interground particulate composition and auxiliary particulate component have respective PSDs within desired parameters, it is typically advantageous to periodically sample and accurately determine particle size and PSD, such as by using particle size analyzers and techniques known in the art. For example, PSD can be determined using laser diffraction techniques. An example of a particle size analyzer that is commonly used to determine the PSD of cements and SCMs is a Malvern Mastersizer 2000. Another example is an online laser diffraction particle size analyzer, such as the Malvern Insitec Fineness Analyzer, available from Malvern Instruments (Worcestershire, UK), which can automatically take a series of PSD measurements of the product in real time and, through a feedback loop, such information can be used to modify the grinding and/or classification process to maintain the PSD within a desired range. Other methods for determining or estimating particle size include, but are not limited to, sieving, optical or electron microscope analysis, x-ray diffraction, sedimentation, elutriation, microscope counting, Coulter counter, and Dynamic Light Scattering.

FIGS. 6-9 are flow charts that illustrate exemplary methods for activating natural pozzolans and manufacturing cement-SCM compositions and/or components thereof. While the descriptions often mention intergrinding clinker with a pozzolan, it is understood that "clinker" can mean granular materials other than cement clinker used to make ordinary Portland cement (OPC).

Figure 6:
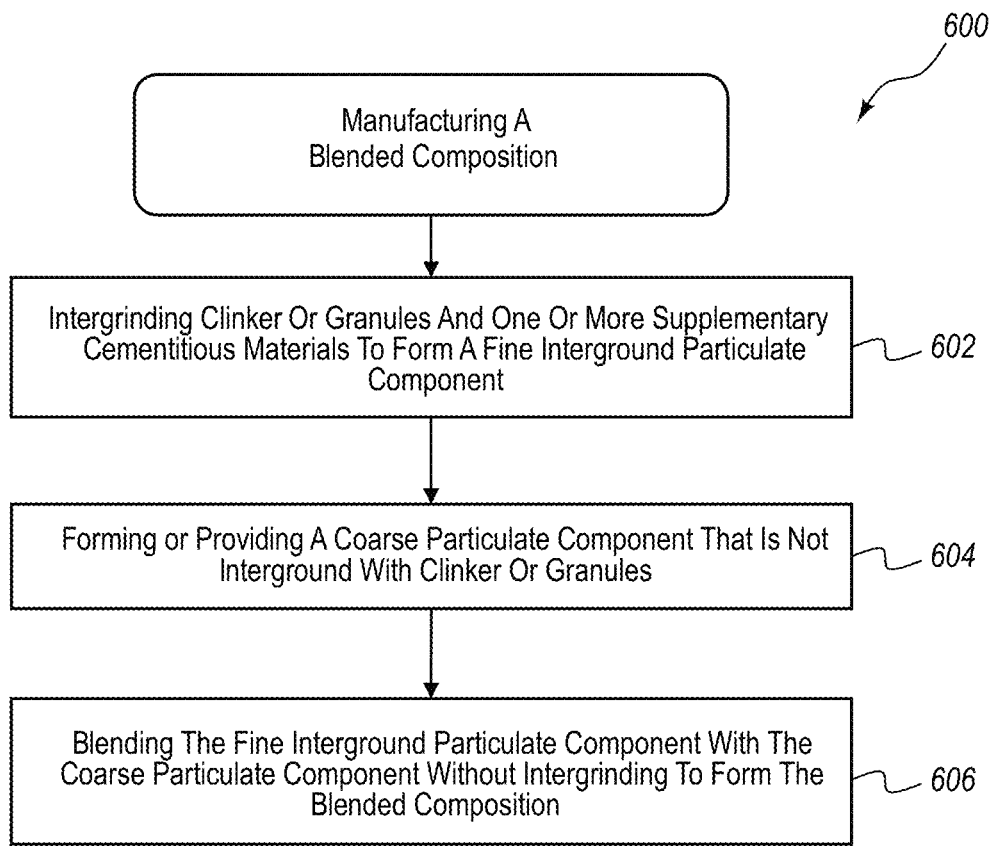
FIG. 6 is a flow diagrams illustrating an example method of manufacturing a blended composition, including a fine interground particulate component.

FIG. 6 illustrates a basic method of manufacturing a blended composition (e.g., activated pozzolan composition or interground cement and SCM) 600 comprising: step 602—intergrinding clinker (e.g., cement clinker) or granules (e.g., metallurgical slag, aggregate or ground mineral) and one or more SCMs (e.g., natural pozzolan) to form a fine interground particulate component; step 604—forming or providing a coarse particulate component that is not interground with the fine interground particulate component; and step 606—blending the fine interground particulate component with the coarse particulate component without intergrinding to form a blended composition (e.g., cement-SCM composition). To this blended composition may optionally be added one or more other additional components as disclosed herein, such as hydraulic cement, SCM or other component, to yield a modified cement-SCM composition.

Figure 7:
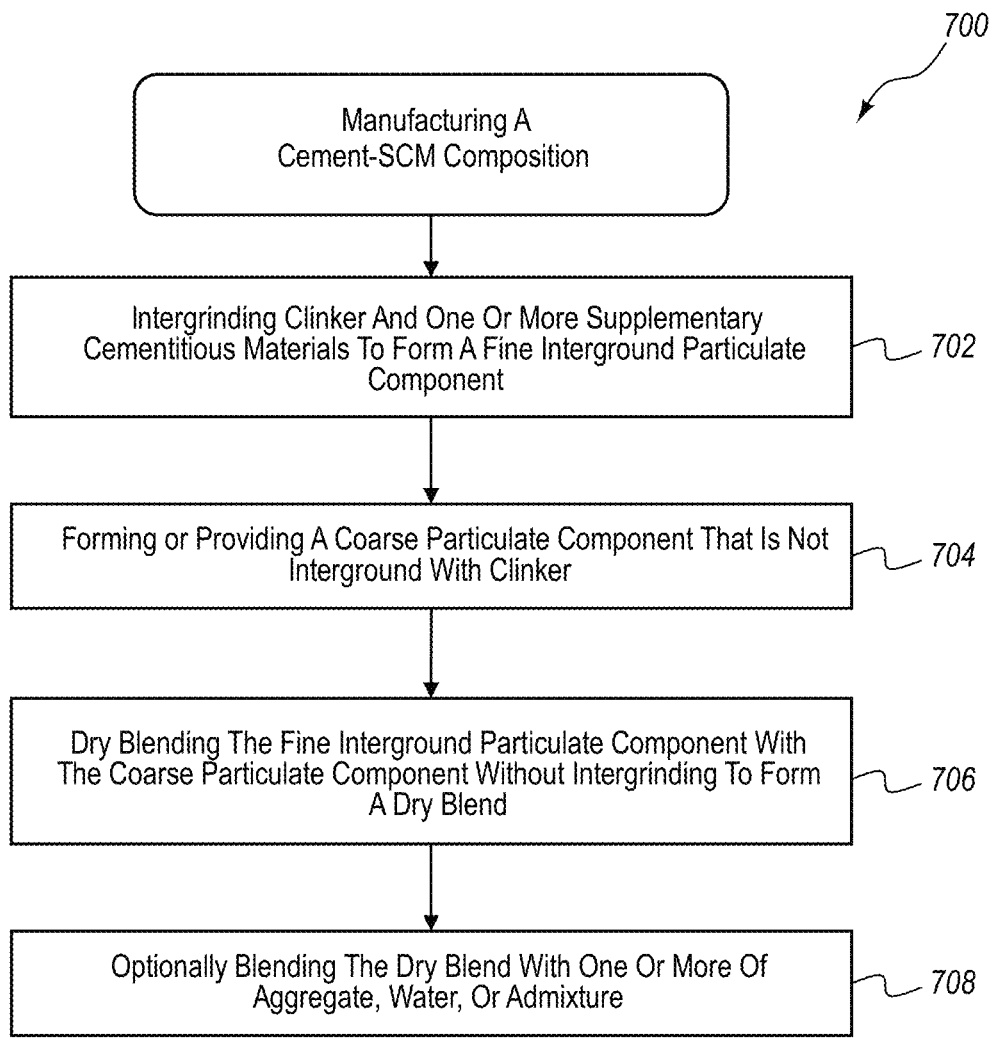
FIGS. 7-9 are flow diagrams illustrating example methods of manufacturing Cement-SCM compositions and/or components thereof.

FIG. 7 illustrates a method of manufacturing a cement-SCM composition 700 comprising: step 702—intergrinding clinker (e.g., cement clinker or granules) and one or more SCMs (e.g., natural pozzolan) to form a fine interground particulate component; step 704—forming or providing a coarse particulate component that is not interground with the fine interground particulate component; step 706—dry blending the fine interground particulate component with the coarse particulate component without intergrinding to form a dry blend; and step 708, optionally blending the dry blend with one or more of aggregate, water, or admixture. To the cement-SCM composition following either of steps 706 or 708 can optionally be added one or more other additional components as disclosed herein to yield a modified cement-SCM composition.

Figure 8:
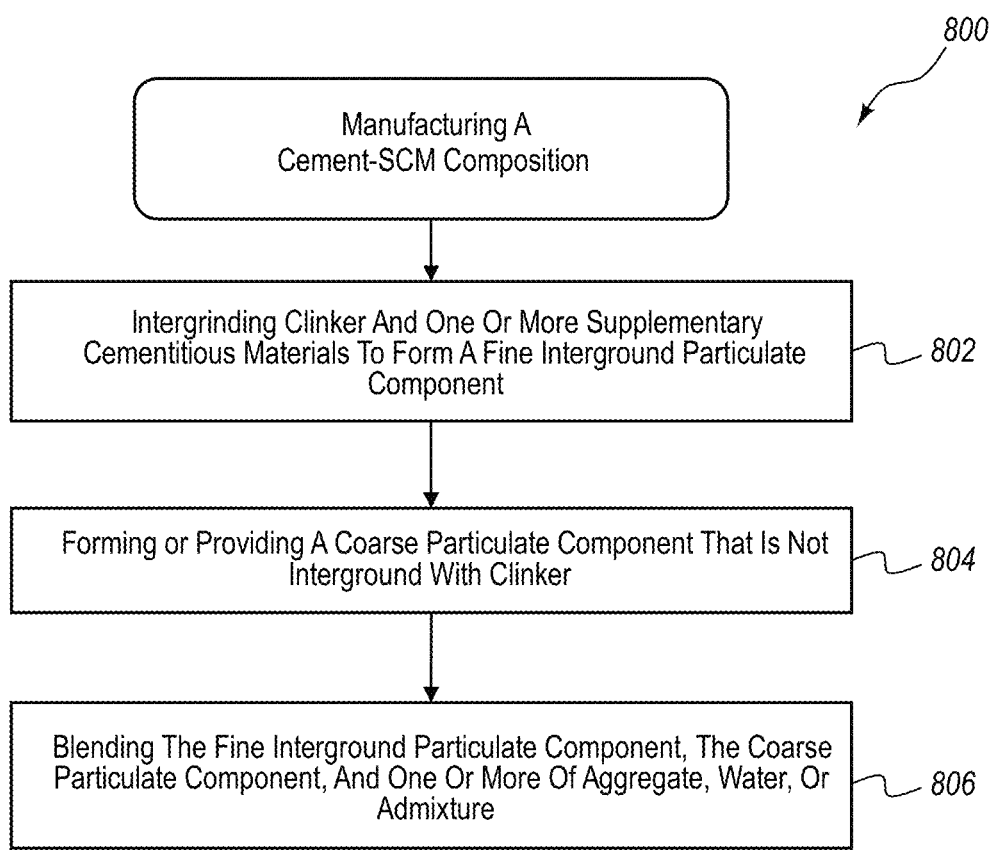

FIG. 8 illustrates another method of manufacturing a cement-SCM composition 800 comprising: step 802—intergrinding clinker (e.g., cement clinker or granules) and one or more SCMs (e.g., natural pozzolan) to form a fine interground particulate component; step 804—forming or providing a coarse particulate component that is not interground with the fine interground particulate component; and step 806—blending the fine interground particulate component, the coarse particulate component, and one or more of aggregate, water, or admixture. To the cement-SCM composition, as part of or following step 806, can be added one or more other additional components as disclosed herein to yield a modified cement-SCM composition.

Figure 9:
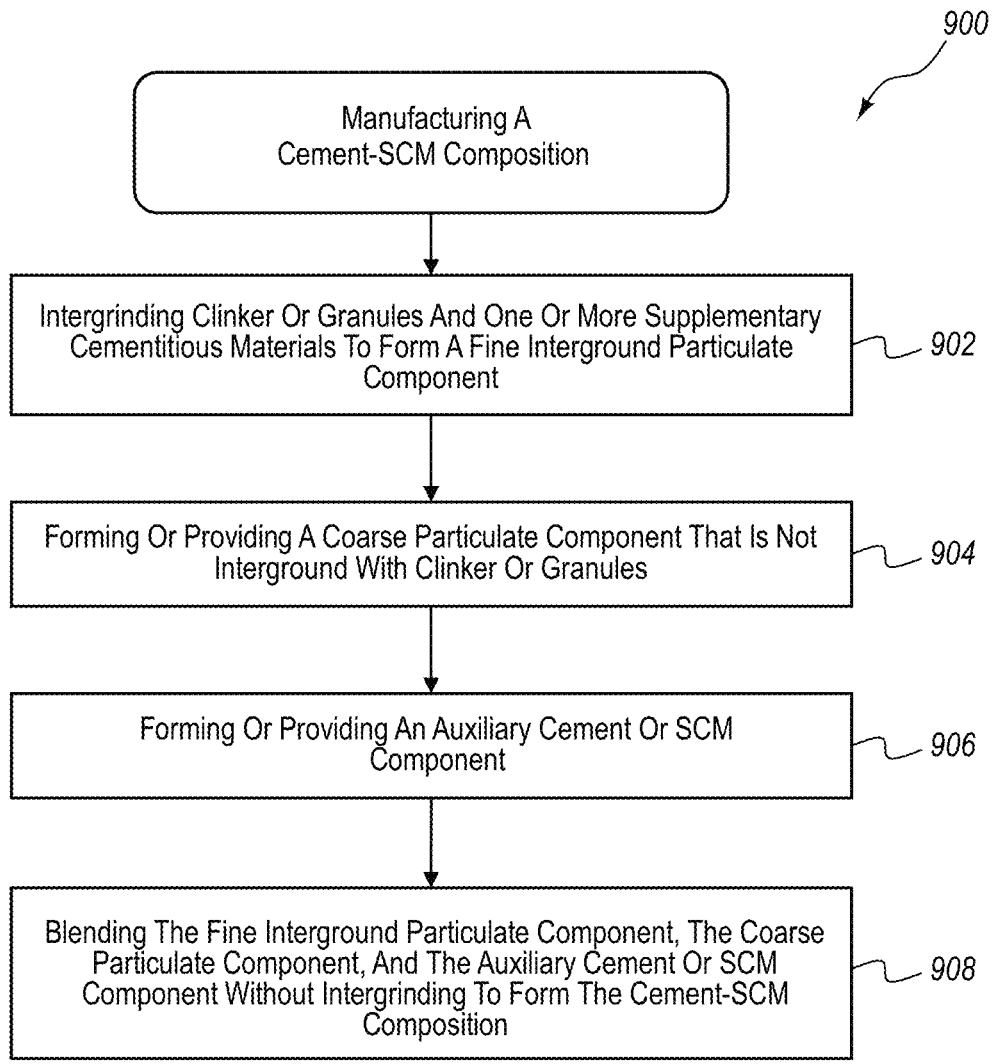

FIG. 9 illustrates another method of manufacturing a cement-SCM composition 900 comprising: step 902—intergrinding clinker or granules, such as cement or SCM, and one or more SCMs (e.g., natural pozzolan) to form a fine interground particulate component; step 904—forming or providing a coarse particulate component that is not interground with the clinker or granules of used to make the fine interground particulate component; step 906—forming or providing an auxiliary particulate component, such as hydraulic cement or SCM; and step 908—blending the fine interground particulate component, the coarse particulate component, and the auxiliary particulate component without intergrinding to form the cement-SCM composition. To the cement-SCM composition can be added one or more other additional components as disclosed herein to yield a modified cement-SCM composition.

Although some of the foregoing methods identify "cement clinker" is being interground with one or more SCMs to yield the fine particulate component, it is understood that other granules or clinkers other than cement clinker can be used to form the fine particulate component, such as one that includes a plurality of SCMs. In such case, the source of hydraulic cement (e.g., OPC) can be blended with the fine particulate component to yield a ternary blend of two separate feed streams. This blend can be blended with a coarse SCM without intergrinding to yield a quaternary blend of three different feed streams.

In some embodiments, a system of manufacturing a cement-SCM composition comprises: (A) one more milling apparatus configured to intergrind hydraulic cement (e.g., cement clinker) or other granular material with one or more SCMs (e.g., natural pozzolan) to form a fine interground particulate component; (B) one or more blending apparatus configured to blend, without intergrinding, the fine interground particulate component with a coarse particulate component comprised of coarse SCM particles; and optionally (C) one or more apparatus for combining, without intergrinding, an auxiliary particulate component with the fine interground particulate component and the coarse particulate component.

In some embodiments, a system of manufacturing a cement-SCM composition comprises: (A) one more milling apparatus configured to intergrind one or more clinkers or granules initially larger than about 1-3 mm with one or more finer particles or powders having an initial particle size less than about 1 mm to form a fine interground particulate component; (B) one or more blending apparatus configured to blend, without intergrinding, the fine interground particulate component with a coarse particulate component comprised of coarse SCM particles; and optionally (C) one or more apparatus for combining, without intergrinding, an auxiliary particulate component with the fine interground particulate component and the coarse particulate component. Where fine interground component (A) is insufficiently hydraulically reactive, the auxiliary particulate component may advantageously include hydraulically reactive particles.

In some embodiments, a system of manufacturing a cement-SCM composition comprises: (A) one more milling apparatus configured to intergrind (1) a first SCM component and (2) a second SCM component to form a fine interground particulate component; (B) one or more blending apparatus configured to blend, without intergrinding, the fine interground particulate component with a hydraulic cement component; and (C) one or more blending apparatus configured to blend, without intergrinding, the fine interground particulate component and the hydraulic cement component with a coarse particulate component; and optionally (D) one or more apparatus for combining, without intergrinding, an auxiliary particulate component (e.g., OPC, SCM, or other material) with components (A), (B) and (C).

Figure 10A:
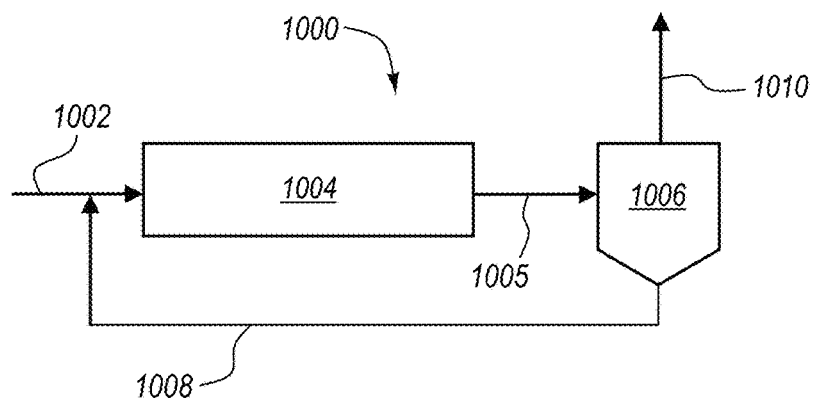
FIGS. 10A and 10B schematically illustrate example milling apparatus for manufacturing one or more components of compositions disclosed, including an interground particulate composition or component.
Figure 10B:
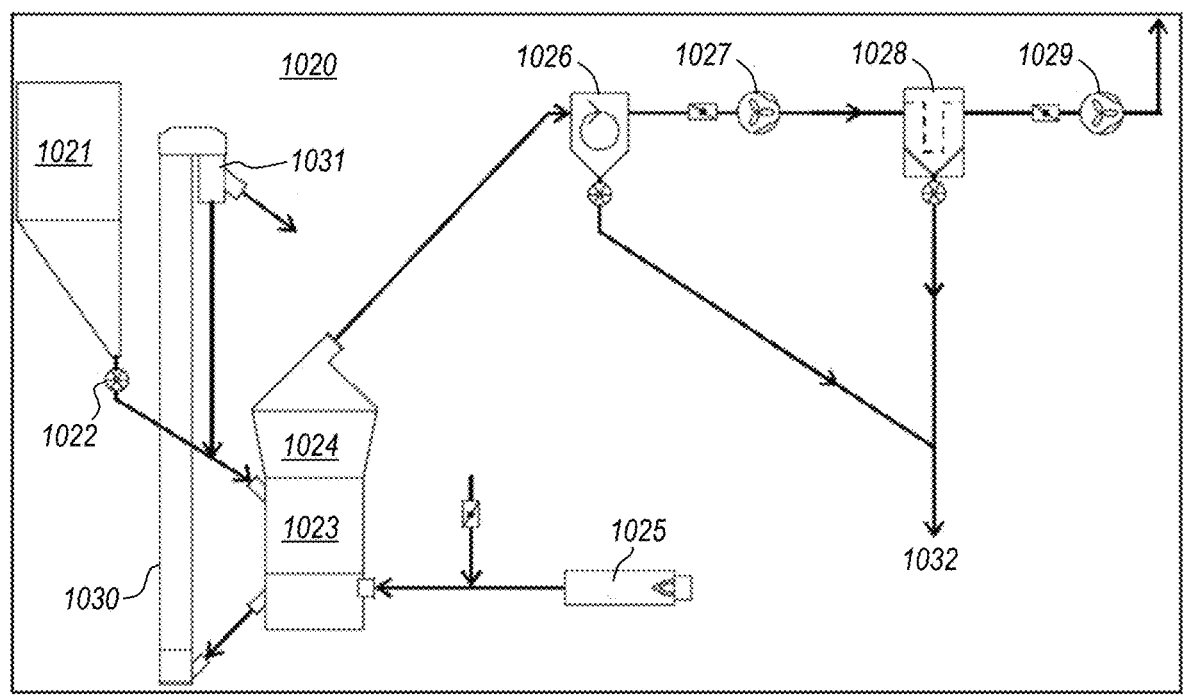

FIGS. 10A and 10B schematically illustrate exemplary milling apparatus that can be used to manufacture the fine interground particulate component and, optionally, in the manufacture at least part of the coarse particulate component and/or the optional auxiliary particulate component.

FIG. 10A more particularly discloses a milling circuit 1000 that includes a transport conduit, conveyor, or apparatus 1002 configured to deliver a stream or mixture of particles, clinker and/or other material to a mill 1004 that comminutes or otherwise reduces the particle size of the material to form a comminuted stream 1005. A separator 1006 integrated with or separate from mill 1004 further processes comminuted stream 1005 and separates it into a coarse fraction 1008, which can be collected as product and/or recycled back to mill 1004 for further comminution, and a fine fraction 1010, which can be collected as product and/or intermediate material that is subjected to further processing using known processing equipment, including, for example, processing equipment disclosed herein. Mill 1004 and/or separator 1006 can be adjusted or modified to produce a fine fraction 1010 having a desired d90, d50, d10 and/or fineness.

Mill 1004 can be any mill used in the art of grinding or comminuting. In the case where mill 1004 and separator 1006 are independent rather than integrated apparatus, mill 1004 can be any known mill that does not include an integrated or internal separator. Non-limiting examples include a ball mill, rod mill, horizontal roll press, high pressure grinding roll, hammer mill, jaw mill, Raymond mill, jet mill, bead mill, high velocity impact mill, acoustic fracturing mill, and the like. Independent separator 1006 can be any known separator, such as a high efficiency air classifier, cyclonic separator, or sieving apparatus.

FIG. 10B more particularly discloses a vertical roller mill system 1020 that includes a feed silo 1021 for storing and delivering a feed material to be processed, metering equipment 1022, such as an auger, for delivering feed material at a predetermined rate, and a vertical roller mill 1023, which receives feed material and mills it using a rotating table (not shown) and rotating stationary rollers (not shown) positioned above the rotating table. A high efficiency classifier 1024 is integrated with and positioned above vertical roller mill 1023. A hot gas generator 1025, which can be powered by natural gas, other fuel, or waste heat from a cement kiln, produces hot gas, which is introduced into vertical roller mill 1023 at a desired temperature, pressure and velocity. The hot gases move upwardly around the outer perimeter of the rotating table within vertical roller mill 1023, where they contact ground particles expelled from the rotating table by centrifugal force and carry at least a portion of the milled particles upward to high efficiency classifier 1024. The hot gases also dry the milled particles. Coarse particles (not shown) that are not carried by the upwardly moving gases to high efficiency classifier 1024 instead drop down below the rotating table, where they are carried by a bucket elevator 1030, passed through a magnetic separator 1031, which separates a waste iron containing stream from a remaining portion of the coarse particles, and the remaining portion is returned to vertical roller mill 1023 (e.g., together with the feed material from feed silo 1021).

High efficiency classifier 1024 separates the milled particles received from vertical roller mill 1023 into a finer fraction, which is carried by the upwardly moving gases to cyclone collector 1026, and a coarser fraction (not shown), which is dropped back onto the rotating table of vertical roller mill 1023 for further milling. The d90 of the finer fraction can be controlled by modifying various parameters of the vertical roller mill system 1020, such as the rate at which the feed material is introduced into vertical roller mill 1023, the pressure exerted on the rotating stationary rollers and transferred to the grinding bed of particles, the speed and/or pressure of the hot gases, and the speed of a rotor containing fins or blades within high efficiency classifier 1024. The d90 can be periodically measured using known PSD-measuring equipment known in the art, such as a laser-diffraction measuring device. A mill fan 1027 assists in causing upward flow of hot gases through vertical roller mill 1023 and high efficiency classifier 1024 and separating milled product 1032 from ultrafine particles, which are collected by a filter 1028 and then combined with milled product 1032 from cyclone collector 1026. A filter fan 1029 assists in moving the ultrafine particles from cyclone collector 1026 toward filter 1028 and expels waste gases into the air.

Figure 11:
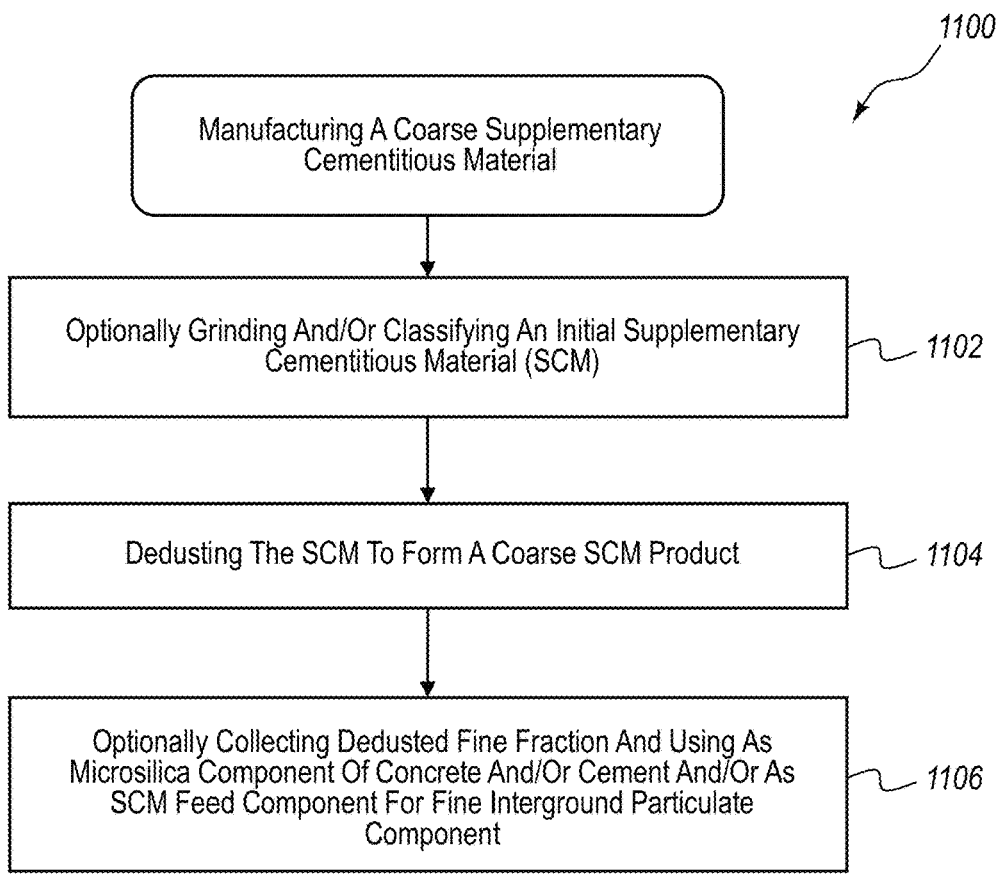
FIG. 11 is a flow diagram illustrating an example method of manufacturing a coarse supplementary cementitious material (SCM), including at least a portion of a coarse particulate component.

FIG. 11 is a flow diagram that illustrates an exemplary method 1100 of manufacturing a coarse supplementary cementitious material comprising: step 1102—optionally grinding and/or classifying an initial SCM; step 1104—dedusting the SCM to form a coarse SCM product; and step 1106, optionally collecting the dedusted fine fraction and using it as desired. For example, the dedusted fine fraction can be used as a micro silica component of concrete and/or blended cement and/or as an SCM feed component for manufacturing the fine interground particulate component. The dedusting process can be performed using known apparatus, such as a high efficiency air classifier that is capable of making sharp cuts or separations, a sieve apparatus, or combination thereof.

Figure 12:
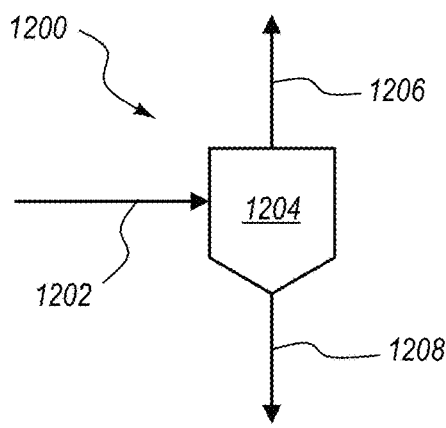
FIG. 12 schematically illustrates an example separation apparatus for use in making one or more components of a cement-SCM composition, including a coarse SCM.

FIG. 12 schematically illustrates an exemplary separation apparatus 1200, which can be used to manufacture one or more particulate components, such as the coarse particulate component and, optionally, in the manufacture of the fine interground particulate component and/or the auxiliary particulate component. The separation apparatus 1200 further includes one or more separation mechanisms 1204 known in the art of particle separation, which receives a stream of particles 1202 and separates the particles into at least a finer particle fraction 1206 and a coarser particle fraction 1208. The one or more separation mechanisms 1204 may also be configured to produce other particle fractions, such as an intermediate particle fraction (not shown) that is less fine than finer particle fraction 1206 and/or less coarse than coarser particle fraction 1208. Examples of one or more separation mechanisms 1204 include apparatus associated with a high efficiency classifier, a cyclonic separator, sieving apparatus, or filter.

Figure 13A:
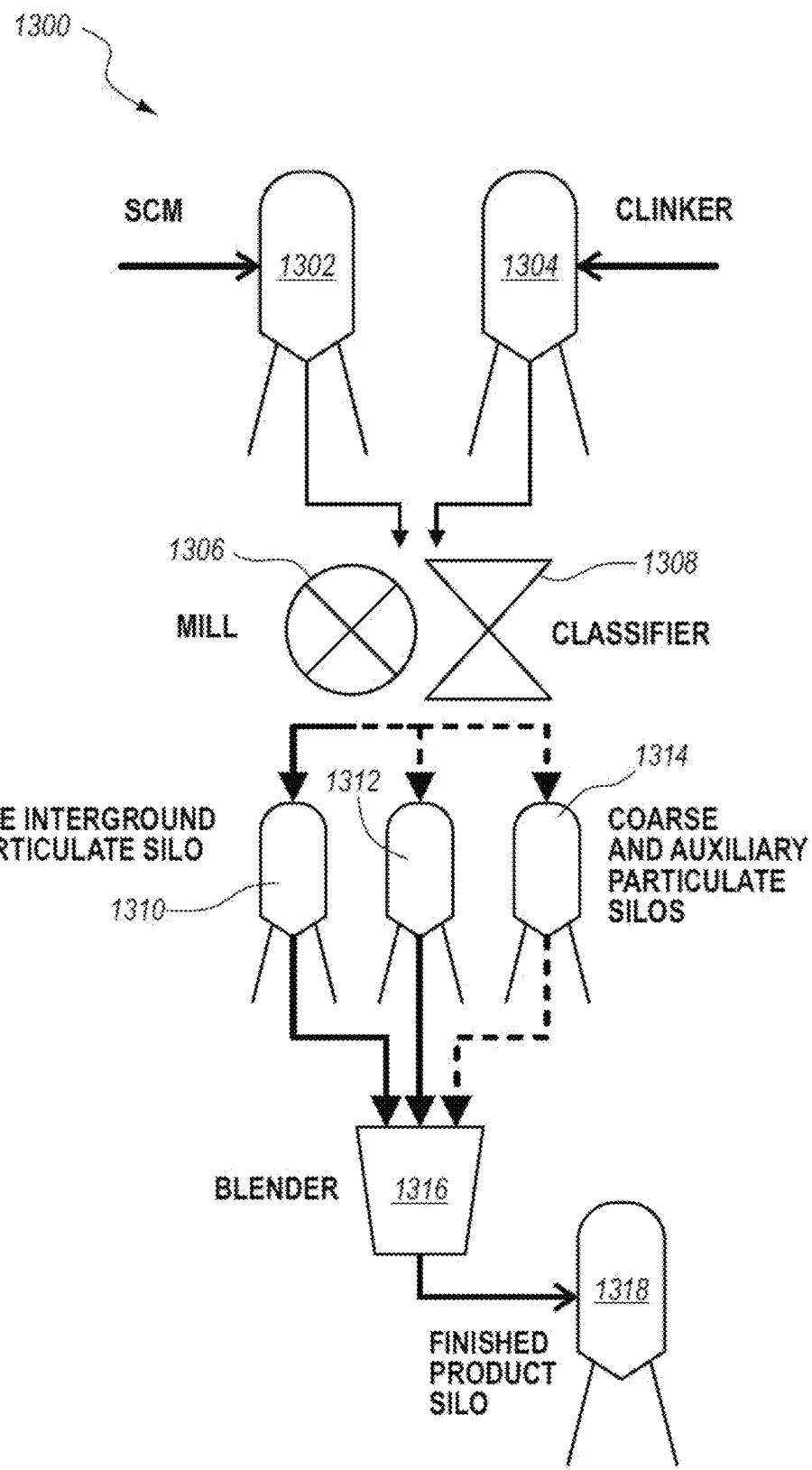
FIGS. 13A-13C schematically illustrate exemplary manufacturing systems for making one or more cement-SCM compositions.

FIG. 13A schematically illustrates an exemplary system 1300 for manufacturing cement-SCM compositions as disclosed herein. System 1300 more particularly includes at least a first storage silo or other container 1302 for a pozzolan or other SCM and a second silo or other storage container 1304 for clinker (e.g., cement clinker or granules), which can be raw or partially milled clinker, other hydraulic cement material, or other large particulate, clinker, or nodule material. Clinker(s) and SCM(s) from storage containers 1302, 1304 are processed according to methods disclosed herein and/or other methods known to those of ordinary skill in the art, such as by means of one or more grinders 1306 or other milling apparatus and one or more classifiers 1308 or other separation apparatus to yield desired materials for making cement-SCM compositions. These include at least (1) a fine interground particulate component comprising a hydraulic cement fraction and an SCM fraction (or first and second SCM fractions), which can be stored within a fine interground particulate silo 1310, and (2) a coarse particulate component comprising coarse SCM particles, which can be stored within a coarse particulate silo 1312. In addition, an optional auxiliary particulate material can be stored within an auxiliary particulate silo 1314.

In some embodiments, as indicated by the dotted arrow leading to coarse particulate silo 1312, the coarse particulate component may be used as received without milling, dedusting or further processing (e.g., fly ash, GGBFS, or other SCMs having a sufficient proportion of coarse particles that complement the fine particulate component). While this may sometimes yield cement-SCM compositions that are less optimal than cement-SCM compositions made using milled, dedusted or other further processed SCMs, simplification of the manufacturing process may justify this outcome (e.g., by reducing capital and/or operating costs of the manufacturing facility). In some embodiments, as indicated by the dotted arrow leading to auxiliary particulate silo 1314, the optional auxiliary particulate component may come pre-processed and need not be further processed by apparatus used to process the fine interground particulate component and/or the coarse particulate component.

A blender 1316 can be used to blend the fine interground particulate material, coarse particulate material, and optional auxiliary particulate material to form a finished product, which, in the case of a dry blended composition, can be stored within finished product silo 1318. In other cases, blender 1316 can be a concrete mixer, such as a stationary mixer used for mixing and batching concrete, or a concrete mixing truck used to mix and transport concrete.

Figure 13B:
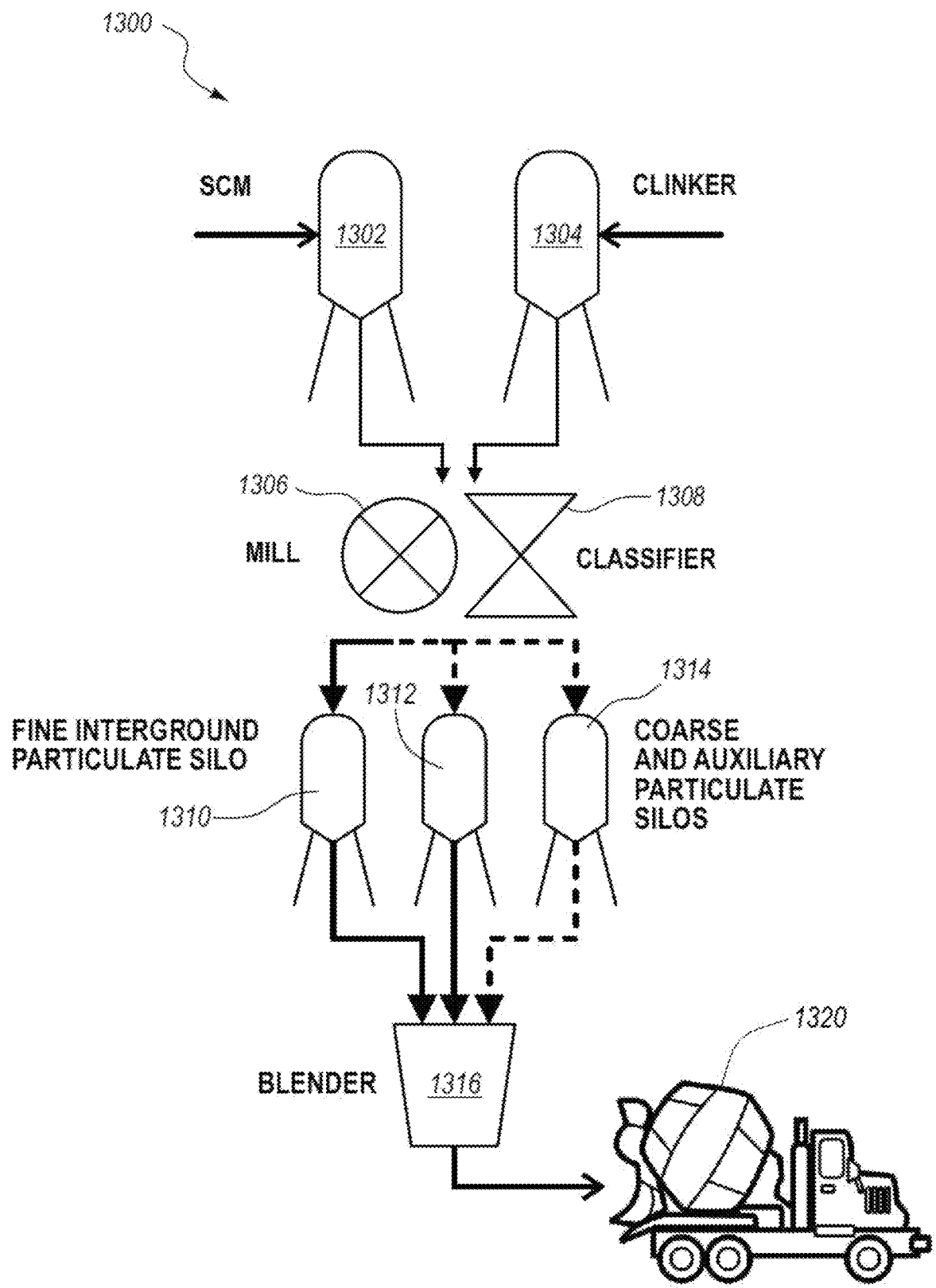

For example, FIG. 13B illustrates a modified system 1300 that includes a blender 1316 that is a stationary mixer used to make a dry blend or fresh concrete mixture that is then fed to a concrete delivery truck or vehicle 1320. If blender 1316 produces a dry blend, water and admixtures can be added directly to concrete delivery vehicle 1320 to form freshly mixed concrete, either at the concrete batch plant, during transport, or at the job site.

Figure 13C:
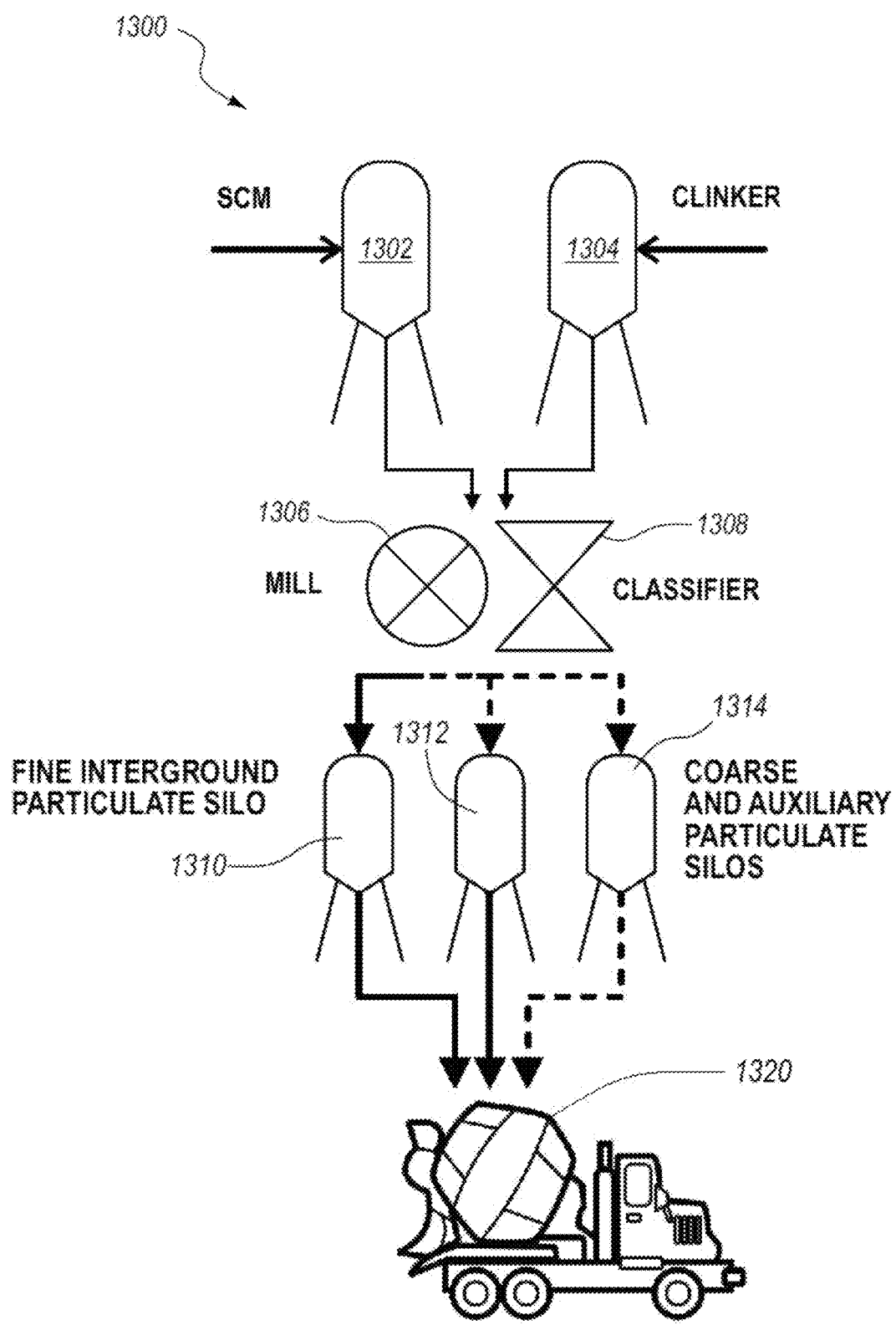

FIG. 13C illustrates yet another modified system 1300 in which the blending apparatus is a concrete delivery truck or vehicle 1320. For example, fine interground particulate silo 1310, coarse particulate silo 1312, and optional auxiliary particulate silo 1314 can be located at a concrete manufacturing plant for dispensing and mixing these material directly within concrete delivery vehicle 1320. As in FIG. 13B, water and admixtures can be added directly to concrete delivery vehicle 1320 to form freshly mixed concrete, either at the concrete batch plant, during transport, or at the job site.

B. Additional Aspects of Natural Pozzolan Activation

The ratio of clinker or granules to natural pozzolan can be 5:95, 10:90, 15:85, 20:80, 25:75, 30:70, 35:65, 40:60, 45:55, 50:50, 55:45, 60:40, 65:35, 70:30, 75:25, 80:20, 85:15, 90:10, 95:5, or any range between any of the foregoing values.

In general, the clinker or granular material is a grindable grinding medium that transfers grinding forces to small pozzolan particles. The preponderance of fine or coarse interground particles from either the initially clinker or granular material or the natural pozzolan often depends on their grindability or hardness. The following are hardness values of various materials, which can be used to determine or estimate the effectiveness of a particular clinker or granular material in transferring grinding forces down to the natural pozzolan being activated:

| Material | Moh Hardness |
|---|---|
| talc | 1 |
| gypsum | 2-3 |
| anhydrite | 3-3.5 |
| bauxite | 1-3 |
| calcite/limestone/chalk | 3 |
| dolomite | 3.5-4 |
| synthetic alumina | 3.4 |
| granite | 4 |
| obsidian (volcanic glass) | 5 |
| volcanic ash | 5-6 |
| pumice | 6, |
| GBFS | 5-6 |
| glass bead | 5.5 |
| steel slag | 6 |
| feldspar | 6 |
| copper slag | 7 |
| fused quartz | 6-7 |
| quartz | 7 |
| porcelain | 6-7 |
| bricks | 5-7 |
| ceramic (e.g., used catalyst) | 7 |
| concrete | 5-7 |
| silica sand | 6-7 |
| basalt | 7 |

In general, using a harder material like steel slag will tend to result in more finely ground natural pozzolan particles with a higher surface area than when a softer material is used (e.g., the particles smaller than the d50 in the interground blend can have a higher percentage of natural pozzolan particles by number, volume, or weight than the particles larger than the d50). Conversely, using a softer material like limestone will tend to result in more coarsely ground natural pozzolan particles with a lower surface area than when a harder material is used (e.g., the particles smaller than the d50 in the interground blend can have a lower percentage of natural pozzolan particles by number, volume, or weight than the particles larger than the d50).

In some embodiments, the activated natural pozzolan can be blended with a pozzolan, such as fly ash that is otherwise out of specification, in order to beneficiate such material (e.g., in order to satisfy the minimum silicon dioxide, plus aluminum oxide, plus iron oxide (SAF) requirements of ASTM C-618 for class C or F fly ash). Granules that contain a high silica content (e.g., granite, basalt, quartz) can be especially beneficial when beneficiating out of specification fly ash. Examples of blending methods for modifying one or more chemical attributes of a blended pozzolan, such as silica content, alumina content, iron oxide content, calcium oxide, or sulfate content, are disclosed in U.S. Pat. No. 9,067,824 to Hansen et al., which is incorporate by reference.

In some embodiments, it may be desirable to intergrind the natural pozzolan with bauxite to increase aluminate content and early strength.

In some embodiments, it may be desirable to mix in one or more additives during or after intergrinding, such as amines, accelerators, alkali salts, calcium salts, lime, gypsum, salts of weak acids, and citric acid, as disclosed herein.

The natural pozzolan can be blended or interground with silica rock dust to make an interground material that has a higher silica content, which may made the blend more pozzolanic. Alternatively, the natural pozzolan can be blended or interground with limestone rock dust to make an interground material that is less pozzolanic and more accelerating.

In some embodiments, steel slag can be a useful grindable grinding media. It is extremely inexpensive, hard, expensive to grind, and on its own it yields a poor quality SCM. However, because it is hard, it can effectively transfer grinding forces down to minute pozzolan (volcanic ash) particles to further reduce size.

III. Cementitious Compositions

In some embodiments, activated pozzolan and cement-SCM compositions disclosed herein can be used as general purpose or specialty cements in place of OPC and other hydraulic cements known in the art. They can be used as sole or supplemental binder to make concrete, ready mix concrete, bagged concrete, bagged cement, mortar, bagged mortar, grout, bagged grout, oil well cement, molding compositions, or other fresh or dry cementitious compositions known in the art. The cement-SCM compositions can be used to manufacture concrete and other cementitious compositions that include a hydraulic cement binder, water and aggregate, such as fine and coarse aggregates. Mortar typically includes cement, water, sand, and lime and is sufficiently stiff to support the weight of a brick or concrete block. Oil well cement refers to a cementitious composition continuously blended and pumped into a well bore. Grout is used to fill in spaces, such as cracks or crevices in concrete structures, spaces between structural objects, and spaces between tiles. Molding compositions are used to manufacture molded or cast objects, such as pots, troughs, posts, walls, floors, fountains, ornamental stone, and the like.

Activated natural pozzolans may include one or more of the following auxiliary components: a calcium-based set accelerator, such as calcium oxide (CaO), calcium chloride (CaCl$_2$), calcium nitrite (Ca(NO$_2$)$_2$), or calcium nitrate (Ca(NO$_3$)$_2$) and/or an alkali metal salt capable of increasing the pH of the mix water, such as sodium hydroxide (NaOH), sodium citrate, or other alkali metal salt of a weak acid. The calcium ions provided by the calcium-based set accelerator will not only accelerate hydration of hydraulic cement (e.g., in cold weather or other situations where it is desired to increase early strength), they can beneficially react with silicate ions from the pozzolan to form additional cement binder products. Alternatively, or in addition, the increased pH provided by the alkali metal salt can accelerate the pozzolanic reaction by accelerating dissolution of silicate ions and/or aluminate ions from the pozzolan and making them more readily available for reaction with calcium and/or magnesium ions provided by the hydraulic cement fraction.

IV. Examples

The following examples are provided to illustrate example cementitious compositions that were made using interground limestone and natural pozzolan particulate blends. In addition, examples of cementitious compositions that utilize(d) an interground blend of limestone and natural pozzolan are set forth in U.S. Provisional Patent Application No. 62/337,424, filed May 17, 2016; U.S. Provisional Patent Application No. 62/451,533, filed Jan. 27, 2017; U.S. Pat. No. 9,957,196; U.S. Provisional Patent Application No. 62/444,736, filed Jan. 10, 2017; U.S. Provisional Patent Application No. 62/451,484, filed Jan. 27, 2017; U.S. Provisional Patent Application No. 62/522,274, filed Jun. 20, 2017; U.S. Pat. No. 10,131,575; U.S. patent application Ser. No. 16/028,398, filed Jul. 5, 2018; and U.S. patent application Ser. No. 16/180,323, filed Nov. 5, 2018. The foregoing patents and patent applications are incorporated herein by reference.

Example 1

A concrete composition was made using the following components, expressed in quantity per cubic yard of concrete.

| | |
|---|---|
| Portland Cement | 282 lb |
| GGBFS (Grade 120) | 141 lb |
| Interground Limestone-Volcanic Ash | 141 lb |
| Water | 266.6 lb |
| Coarse Aggregate (1 inch minus) | 1750 lb |
| Fine Aggregate (ASTM C33 sand) | 1321 lb |

The concrete composition was cast into 4×8 inch cylinders, which were tested and had a compressive strength of 5200 psi at 28 days, similar to a control concrete containing 564 lb of OPC per cubic yard.

Example 2

A concrete composition was made using the following components, expressed in quantity per cubic yard of concrete.

| | |
|---|---|
| Portland Cement | 169.2 lb |
| GGBFS (Grade 120) | 253.8 lb |
| Interground Limestone-Volcanic Ash | 141 lb |
| Water | 266.6 lb |
| Coarse Aggregate (1 inch minus) | 1750 lb |
| Fine Aggregate (ASTM C33 sand) | 1320 lb |

The concrete composition was cast into 4×8 inch cylinders, which were tested and had a compressive strength of 4450 psi at 28 days.

Example 3

A concrete composition was made using the following components, expressed in quantity per cubic yard of concrete.

| | |
|---|---|
| Portland Cement | 387.2 lb |
| Interground Limestone-Volcanic Ash | 211.2 lb |
| Finely Ground Volcanic Ash | 105.6 lb |
| Water | 245.7 lb |
| Pea Gravel | 1408 lb |
| Fine Aggregate (ASTM C33 sand) | 1408 lb |

The concrete composition was mixed together with a superplasticizer, air entraining agent, and viscosity modifying agent to form self consolidating concrete, cast into 4×8 inch cylinders, and found to have a compressive strength of 7940 psi at 28 days.

Example 4

A concrete composition was made using the following components, expressed in quantity per cubic yard of concrete.

| | |
|---|---|
| Portland Cement | 387.2 lb |
| Interground Limestone-Volcanic Ash | 211.2 lb |
| Fine Classified Fly Ash | 105.6 lb |
| Water | 245.7 lb |
| Pea Gravel | 1408 lb |
| Fine Aggregate (ASTM C33 sand) | 1408 lb |

The concrete composition was mixed together with a superplasticizer, air entraining agent, and viscosity modifying agent to form self consolidating concrete, cast into 4×8 inch cylinders, and found to have a compressive strength of 7950 psi at 28 days.

Example 5

A concrete composition was made using the following components, expressed in quantity per cubic yard of concrete.

| | |
|---|---|
| Portland Cement | 366.6 lb |
| Interground Limestone-Volcanic Ash | 56.4 lb |
| Coarse Dedusted Fly Ash | 141 lb |
| Water | 264.9 lb |
| Coarse Aggregate (1 inch minus) | 1750 lb |
| Fine Aggregate (ASTM C33 sand) | 1316 lb |

The concrete composition was cast into 4×8 inch cylinders, which were tested and had a compressive strength of 4440 psi at 28 days.

Example 6

A mortar cube composition was made using the following components.

| | |
|---|---|
| Portland Cement | 752 g |
| Interground Limestone-Volcanic Ash | 188 g |
| Water | 450 g |
| Sand (ASTM C109 sand) | 2550 g |

The mortar cube composition was cast into 2×2 inch cubes, which were tested and had a compressive strength of 6470 psi at 28 days.

Example 7

A mortar cube composition was made using the following components.

| | |
|---|---|
| Portland Cement | 752 g |
| Interground Limestone-Volcanic Ash | 141 g |
| Finely Ground Volcanic Ash | 47 g |
| Water | 450 g |
| Sand (ASTM C109 sand) | 2550 g |

The mortar cube composition was cast into 2×2 inch cubes, which were tested and had a compressive strength of 6950 psi at 28 days.

Example 8

A mortar cube composition was made using the following components.

| | |
|---|---|
| Portland Cement | 752 g |
| Interground Limestone-Volcanic Ash | 141 g |
| Fine Classified Fly Ash | 47 g |
| Water | 450 g |
| Sand (ASTM C109 sand) | 2550 g |

The mortar cube composition was cast into 2×2 inch cubes, which were tested and had a compressive strength of 6780 psi at 28 days.

Example 9

A mortar cube composition was made using the following components.

| | |
|---|---|
| Portland Cement | 752 g |
| Interground Limestone-Volcanic Ash | 282 g |
| Finely Ground Steel Slag | 47 g |
| Water | 450 g |
| Sand (ASTM C109 sand) | 2550 g |

The mortar cube composition was cast into 2×2 inch cubes, which were tested and had a compressive strength of 7250 psi at 28 days.

Example 10

A mortar cube composition was made using the following components.

| | |
|---|---|
| Portland Cement | 658 g |
| Interground Limestone-Volcanic Ash | 211.5 g |
| Finely Ground Volcanic Ash | 70.5 g |
| Water | 450 g |
| Sand (ASTM C109 sand) | 2550 g |

The mortar cube composition was cast into 2×2 inch cubes, which were tested and had a compressive strength of 5795 psi at 28 days.

Example 11

A mortar cube composition was made using the following components.

| | |
|---|---|
| Portland Cement | 490 g |
| GGBFS (Grade 120) | 245 g |
| Interground Limestone-Volcanic Ash | 245 g |
| Water | 474 g |
| Sand (ASTM C109 sand) | 2550 g |

The mortar cube composition was cast into 2×2 inch cubes, which were tested and had a compressive strength of 6705 psi at 28 days.

Example 12

A mortar cube composition was made using the following components.

| | |
|---|---|
| Portland Cement | 490 g |
| GGBFS (Grade 120) | 245 g |
| Interground Limestone-Volcanic Ash | 122.5 g |
| Coarse Dedusted Fly Ash | 122.5 g |
| Water | 476 g |
| Sand (ASTM C109 sand) | 2550 g |

The mortar cube composition was cast into 2×2 inch cubes, which were tested and had a compressive strength of 6550 psi at 28 days.

Example 13

A mortar cube composition was made using the following components.

| | |
|---|---|
| Portland Cement | 282 g |
| GGBFS (Grade 120) | 470 g |
| Interground Limestone-Volcanic Ash | 188 g |
| Water | 456 g |
| Sand (ASTM C109 sand) | 2580 g |

The mortar cube composition was cast into 2×2 inch cubes, which were tested and had a compressive strength of 6705 psi at 28 days.

Example 14

A mortar cube composition was made using the following components.

| | |
|---|---|
| Portland Cement | 294 g |
| GGBFS (Grade 120) | 490 g |
| Coarse Dedusted Fly Ash | 147 g |
| Interground Limestone-Volcanic Ash | 49 g |
| Water | 476 g |
| Sand (ASTM C109 sand) | 2550 g |

The mortar cube composition was cast into 2×2 inch cubes, which were tested and had a compressive strength of 6710 psi at 28 days.

Example 15

A mortar cube composition was made using the following components.

| | |
|---|---|
| Portland Cement | 245 g |
| GGBFS (Grade 120) | 245 g |
| Ultrafine Fly Ash | 146 g |
| Interground Limestone-Volcanic Ash | 292 g |
| Lime (Calcium Hydroxide) | 49 g |
| Water | 254 g |
| Sand (ASTM C109 sand) | 1900 g |

The mortar cube composition was mixed with a superplastizer and cast into 2×2 inch cubes, which were tested and had a compressive strength of 9155 psi at 28 days.

Example 16

A mortar cube composition was made using the following components.

| | |
|---|---:|
| Portland Cement | 283.5 g |
| GGBFS (Grade 120) | 283.5 g |
| Interground Limestone-Volcanic Ash | 243 g |
| Water | 324 g |
| Sand (ASTM C109 sand) | 1903.5 g |

The mortar cube composition was mixed with a low range water reducer and cast into 2×2 inch cubes, which were tested and had a compressive strength of 8040 psi at 28 days.

Example 17

A mortar cube composition was made using the following components.

| | |
|---|---:|
| Portland Cement | 283.5 g |
| GGBFS (Grade 120) | 283.5 g |
| Ultrafine Fly Ash | 77 g |
| Interground Limestone-Volcanic Ash | 162 g |
| Lime (Calcium Hydroxide) | 4.05 g |
| Water | 324 g |
| Sand (ASTM C109 sand) | 1896 g |

The mortar cube composition was mixed with a low range water reducer and cast into 2×2 inch cubes, which were tested and had a compressive strength of 7915 psi at 28 days.

Example 18

A mortar cube composition was made using the following components.

| | |
|---|---:|
| Portland Cement | 400 g |
| GGBFS (Grade 120) | 400 g |
| Ultrafine Fly Ash | 77 g |
| Interground Limestone-Volcanic Ash | 294 g |
| Lime (Calcium Hydroxide) | 8.10 g |
| Water | 243 g |
| Citric Acid | 0.33 g |
| Sand (ASTM C109 sand) | 1850 g |

The mortar cube composition was mixed with a superplasticizer and cast into 2×2 inch cubes, which were tested and had a compressive strength of 12,315 psi at 28 days.

Example 19

A mortar cube composition was made using the following components.

| | |
|---|---:|
| White Cement | 472 g |
| GGBFS (Grade 120) | 472 g |
| Interground Limestone-Volcanic Ash | 212.4 g |
| Lime (Calcium Hydroxide) | 23.6 g |
| Water | 424.06 g |
| Silica Sand | 1320 g |

The mortar cube composition was mixed with a superplasticizer and cast into 2×2 inch cubes, which were tested and had a compressive strength of 9735 psi at 28 days.

Example 20

A mortar cube composition was made using the following components.

| | |
|---|---:|
| White Cement | 413 g |
| GGBFS (Grade 120) | 472 g |
| Interground Limestone-Volcanic Ash | 283.2 g |
| Lime (Calcium Hydroxide) | 11.8 g |
| Water | 424.06 g |
| Silica Sand | 1304 g |

The mortar cube composition was mixed with a superplasticizer and cast into 2×2 inch cubes, which were tested and had a compressive strength of 7520 psi at 28 days.

Example 21

A mortar cube composition was made using the following components.

| | |
|---|---:|
| White Cement | 354 g |
| GGBFS (Grade 120) | 531 g |
| Interground Limestone-Volcanic Ash | 283.2 g |
| Lime (Calcium Hydroxide) | 11.8 g |
| Water | 424.06 g |
| Silica Sand | 1300 g |

The mortar cube composition was mixed with a superplasticizer and cast into 2×2 inch cubes, which were tested and had a compressive strength of 7290 psi at 28 days.

Example 22

A mortar cube composition was made using the following components.

| | |
|---|---:|
| White Cement | 524 g |
| GGBFS (Grade 120) | 524 g |
| Interground Limestone-Volcanic Ash | 246.6 g |
| Lime (Calcium Hydroxide) | 13.1 g |
| Water | 381 g |
| Silica Sand | 1314 g |

The mortar cube composition was mixed with a superplasticizer and cast into 2×2 inch cubes, which were tested and had a compressive strength of 10,670 psi at 28 days.

Example 23

A mortar cube composition was made using the following components.

| | |
|---|---:|
| White Cement | 554 g |
| GGBFS (Grade 120) | 554 g |
| Interground Limestone-Volcanic Ash | 123.7 g |
| Type S Lime | 6.19 g |
| Latex adhesive | 30.17 |
| Water | 337 g |
| Coarse Silica Sand | 447.65 g |
| Fine Silica Sand | 654.25 g |
| Marble White 80 | 242 g |
| Glass Fibers | 98 g |

The mortar cube composition was mixed with a superplasticizer and cast into 2×2 inch cubes, which were tested and had a compressive strength of 12,860 psi at 28 days.

Example 24

A ready mixed concrete composition was made using the following components, expressed in quantity per cubic yard of concrete.

| | |
|---|---|
| Portland Cement | 429 lb |
| Class F Fly Ash | 102 lb |
| Interground Limestone-Volcanic Ash | 125.72 lb |
| Type S Lime | 1.65 lb |
| Plaster of Paris | 1.65 lb |
| Water | 283.8 lb |
| Air Entraining Agent | 13.27 oz |
| Low Range Water Reducer | 15.93 oz |
| Mid Range Water Reducer | 21 oz |
| Coarse Aggregate (1 inch minus) | 1675 lb |
| Fine Aggregate (ASTM C33 sand) | 1215 lb |

The concrete composition was made in a concrete mixing/delivery truck with a slump of 6 inches. The majority of the composition was poured into form as part of a driveway slab 6 inches thick and reinforced with rebar. The concrete had placement and finishing properties similar to conventional concrete and was ready for final surface finishing in approximately 2-3 hours after pouring.

A portion of the concrete was cast into 4×8 inch cylinders, which were tested and had a compressive strength of 4000 psi at 28 days and 4500 psi in 91 days. While the strength was lower than expected, this may have been due to excessive air entrainment owing to the combined use of air entrainment agent and mid range water reducer. The concrete slab was exposed to periodic freeze-thaw cycles for at least 45 days without showing any signs of spalling or other damage.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. An activated pozzolan composition consisting of an interground particulate blend formed by intergrinding an initially granular material with a natural pozzolan,
wherein the initially granular material interground with the natural pozzolan is a non-lime-bearing material selected from the group consisting of limestone, fine aggregate, shale, geologic material, natural minerals, waste glass, glass shards, basalt, sinters, ceramics, recycled bricks, recycled concrete, other waste industrial products, and sand; and further optionally comprising one or more selected from the group consisting of calcium chloride ($CaCl_2$), calcium nitrite ($Ca(NO_2)_2$), calcium nitrate ($Ca(NO_3)_2$), alkali metal salt, sodium hydroxide (NaOH), sodium citrate, or alkali metal salt of a weak acid.

2. The activated pozzolan composition of claim 1, wherein the initially granular material has an initial particle size of at least 1 mm prior to being interground with the natural pozzolan.

3. The activated pozzolan composition of claim 1, wherein the natural pozzolan is selected from the group consisting of calcined clay, metakaolin, volcanic ash, tuff, trass, pumice, perlite, and other materials of volcanic origin.

4. The activated pozzolan composition of claim 1, wherein the natural pozzolan has an initial particle size of less than about 1 mm prior to being interground with the initially granular material.

5. The activated pozzolan composition of claim 1, wherein the natural pozzolan has an initial moisture content prior to being interground with the initially granular material, and wherein the interground particulate blend has a moisture content less than the initial moisture content.

6. The activated pozzolan composition of claim 1, wherein the interground particulate blend has a d90 equal to or less than about 25 μm.

7. The activated pozzolan composition of claim 1, wherein the interground particulate blend has a d50 equal to or less than about 12 μm.

8. The activated pozzolan composition of claim 1, wherein the interground particulate blend has a d10 equal to or less than about 2 μm.

9. An activated pozzolan composition consisting of and formed by intergrinding an initially granular and non-lime bearing material comprising at least one of calcium carbonate or silica having an initial size of at least 1 mm with a natural pozzolan having an initial moisture content to form an interground particulate blend having a d90 equal to or less than about 45 μm and a resulting moisture content less than the initial moisture content.

10. The activated pozzolan composition of claim 9, wherein the natural pozzolan has an initial moisture content of at least 3% prior to being interground with the initially granular material.

11. The activated pozzolan composition of claim 9, wherein the interground particulate blend has a moisture content of less than 0.5%.

12. The activated pozzolan composition of claim 9, wherein the interground particulate blend has a d50 equal to or less than about 16 μm and a d10 equal to or less than about 2.5 μm.

13. The activated pozzolan composition of claim 9, wherein the initially granular and non-lime bearing material interground with the natural pozzolan is selected from the group consisting of limestone, dolomite, aggregate, shale, geologic materials, natural minerals, waste glass, glass shards, basalt, sinters, ceramics, recycled bricks, recycled concrete, and other waste industrial materials, and wherein the natural pozzolan comprises calcined clay, metakaolin, volcanic ash, tuff, trass, pumice, perlite, or other material of volcanic origin.

14. An activated pozzolan composition consisting of a dry interground particulate blend of limestone that has not been calcined to form calcium oxide (CaO) and volcanic ash, the dry interground particulate blend having a d90 equal to or less than about 45 μm, a d50 equal to or less than about 18 μm, and a d10 equal to or less than about 3 μm.

15. The activated pozzolan composition of claim 14, wherein dry interground particulate blend is formed by intergrinding the limestone and volcanic ash to form an interground limestone-volcanic ash particulate blend, wherein the volcanic ash has an initial moisture content of at least 3% prior to being interground with the limestone.

16. The activated pozzolan composition of claim 15, wherein the interground limestone-volcanic ash particulate blend has a moisture content of less than 0.5%.

17. The activated pozzolan composition of claim 15, wherein the limestone is initially granular with an initial particle size of at least about 3 mm prior to being interground with the volcanic ash, and wherein the volcanic ash has an initial particle size less than about 1 mm prior to being interground with the limestone.

* * * * *